United States Patent
Ohtake et al.

(10) Patent No.: US 7,738,185 B2
(45) Date of Patent: Jun. 15, 2010

(54) ZOOM LENS AND IMAGING APPARATUS

(75) Inventors: Motoyuki Ohtake, Saitama (JP); Koji Okajima, Kanagawa (JP); Mitsuhiro Suzaki, Tokyo (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 10/594,328

(22) PCT Filed: Feb. 17, 2006

(86) PCT No.: PCT/JP2006/302816

§ 371 (c)(1),
(2), (4) Date: Aug. 10, 2007

(87) PCT Pub. No.: WO2006/092966

PCT Pub. Date: Sep. 8, 2006

(65) Prior Publication Data

US 2008/0043344 A1    Feb. 21, 2008

(30) Foreign Application Priority Data

Mar. 3, 2005    (JP) .............................. 2005-059051

(51) Int. Cl.
*G02B 14/15* (2006.01)
(52) U.S. Cl. ................ 359/687; 359/683; 359/684; 359/685; 359/715; 359/740; 359/774
(58) Field of Classification Search ......... 359/683–685, 359/687, 715, 740, 774
See application file for complete search history.

(56) References Cited

U.S. PATENT DOCUMENTS

| 6,226,130 B1 * | 5/2001 | Mukaiya et al. ............. 359/687 |
| 6,473,231 B2 * | 10/2002 | Hamano et al. ............. 359/687 |
| 6,606,194 B2 * | 8/2003 | Hamano et al. ............. 359/687 |
| 7,193,787 B2 * | 3/2007 | Horiuchi ..................... 359/684 |

FOREIGN PATENT DOCUMENTS

| JP | 06-337353 | 12/1994 |
| JP | 07-128619 A | 5/1995 |
| JP | 08-179206 A | 7/1996 |

(Continued)

OTHER PUBLICATIONS

WIPO English tranlation of Written Opinion of International Searching Authority for International Application No. PCT/JP2006/302816.

(Continued)

*Primary Examiner*—Evelyn A. Lester
(74) *Attorney, Agent, or Firm*—Rader, Fishman & Grauer PLLC

(57) ABSTRACT

A zoom lens and imaging apparatus implementing four lens groups including a first lens group G1 having a positive refractive power, a second lens group G2 having a negative refractive power, a third lens group G3 having a positive refractive power, and a fourth lens group G4 having a positive refractive power. When a positional state is varied from a wide-angle-end state to a telephoto-end state, the second lens group is moved to an image side, and the fourth lens group is moved to compensate for image plane variation caused by the movement of the second lens group.

14 Claims, 14 Drawing Sheets

| | FOREIGN PATENT DOCUMENTS | | |
|---|---|---|---|
| JP | 09-281390 A | 10/1997 |
| JP | 09-281391 A | 10/1997 |
| JP | 09-304698 A | 11/1997 |
| JP | 11-023965 A | 1/1999 |
| JP | 11-237550 | 8/1999 |
| JP | 11-305120 A | 11/1999 |
| JP | 2000-121940 A | 4/2000 |
| JP | 2002-365544 | 12/2002 |
| JP | 2003-098434 | 4/2003 |
| JP | 2003-241088 A | 8/2003 |
| JP | 2006-047771 | 2/2006 |

OTHER PUBLICATIONS

Supplemental European Search Report and Opinion dated Jun. 11, 2008 for corresponding Application No. 06 71 3957.
International Search Report, Application No. PCT/JP2006/302816, dated May 23, 2006.
Japanese Office Action issued Feb. 25, 2010 for corresponding Japanese Application No. 2005-059051.

* cited by examiner

ZOOM LENS AND IMAGING APPARATUS

TECHNICAL FIELD

The present invention relates to a novel zoom lens and a novel imaging apparatus. In particular, the present invention relates to a zoom-lens with a long back focus appropriate for 3CCD imaging system, which is used for a video camera, digital still camera, or the like, and to an imaging apparatus provided with the zoom lens.

BACKGROUND ART

Conventionally, there has been known, as a recording means for a camera, a recording method which includes forming on a surface of an imager an object image by the imager using a photoelectric converter such as a CCD (Charge Coupled Device) or CMOS (Complementary Metal-Oxide Semiconductor), and converting an amount of light of the object image into electric output by the photoelectric converter.

According to technological progress on fine processing technology in recent years, a Central Processing Unit (CPU) has been speeded up and a recording medium has been highly integrated, so that an extra-large volume of image data, which could not be handled before, can be processed at high speed. In addition, a light-receiving element has been also highly integrated and reduced in size. The high integration allows higher spacial frequency to be recorded, and the reduction in size allows downsizing of the whole camera.

However, the high integration and reduction in size reduces a light reception area of the photoelectric converter. Accordingly, influence of noise may be increased caused by decrease in the electric output. To avoid this, there has been attempted that the amount of light reaching the light-receiving element is increased by increasing an aperture ratio of an optical system, or that an extra-small lens element (i.e., micro-lens array) is disposed in front of the element. The micro-lens array guides light beam incident on a gap between the adjacent elements onto the element, however, it restricts the position of an exit pupil of the lens system. In particular, when the position of the exit pupil of the lens system comes close to the light-receiving element, an angle formed by chief ray reaching the light-receiving element and by the optical axis is increased, and consequently, an angle formed by off-axis light beam heading to the periphery of a screen and by the optical axis is more increased. Accordingly, the off-axis light beam would not reach the light-receiving element, thereby providing an insufficient amount of light.

There is known, for instance, a positive-negative-positive-positive four-group zoom lens as the zoom lens appropriate for the video camera, digital still camera, or the like, which records the object image by the above-mentioned photoelectric converter.

The positive-negative-positive-positive four-group zoom lens includes a first lens group having a positive refractive power, a second lens group having a negative refractive power, a third lens group having a positive refractive power, and a fourth lens group having a positive refractive power, sequentially arranged from an object side. When a positional state of the lenses is varied from a wide-angle-end state to a telephoto-end state, the first lens group and the third lens group are fixed along the optical axis, the second lens group is moved to an image side for varying magnification, and the fourth lens group is moved for compensating a variation in a position of an image plane caused by the movement of the second lens group.

For instance, there have been known zoom lenses disclosed in Japanese Unexamined Patent Application Publication Nos. 6-337353 and 2002-365544.

However, according to the above-mentioned conventional zoom lens, when a zoom ratio (=focal length in the telephoto-end state/focal length in the wide-angle-end state) is increased, an amount of the movement of the second lens group is increased. Consequently, the off-axis light beam passing through the first lens group comes away from the optical axis, and lens diameters of the first lens group may be increased.

Particularly in the conventional positive-negative-positive-positive four-group zoom lens, the amount of the movement of the second lens group for magnification-varying operation is increased in order to increase the zoom ratio. Therefore the off-axis light beam passing through the first lens group likely comes away from the optical axis, thus being difficult to achieve both the reduction in lens diameters and the high variable magnification.

To solve the above-described problems, the present invention provides a zoom lens having a high zoom ratio and easily allowing lens diameters to be reduced, and an imaging apparatus provided with the zoom lens.

DISCLOSURE OF INVENTION

To solve the above-described problems, a zoom lens according to the present invention includes: four lens groups including a first lens group having a positive refractive power, a second lens group having a negative refractive power, a third lens group having a positive refractive power, and a fourth lens group having a positive refractive power, sequentially arranged from an object side, in which when a positional state of lenses is varied from a wide-angle-end state to a telephoto-end state, the second lens group is moved to an image side, the fourth lens group is moved for compensating a variation in a position of an image plane caused by the movement of the second lens group, and the first lens group and the third lens group are fixed along the optical axis; and an aperture stop disposed at the object side of the third lens group, in which the third lens group includes a negative sub-lens group having a negative refractive power, and a positive sub-lens group disposed at the image side of the negative sub-lens group with an airspace interposed therebetween, the positive sub-lens group having a positive refractive power, and the following conditional expression (1) is satisfied:

$$0.4 < Da/TL < 0.5 \qquad (1)$$

where Da is a distance between the aperture stop and the image plane, and TL is an overall optical length (distance between a lens surface at the most object side in a lens system and the position of the image plane, along the optical axis).

In addition, an imaging apparatus according to the present invention includes: a zoom lens; and an imager which converts an optical image formed by using the zoom lens into electric signals, in which the zoom lens includes: four lens groups including a first lens group having a positive refractive power, a second lens group having a negative refractive power, a third lens group having a positive refractive power, and a fourth lens group having a positive refractive power, sequentially arranged from an object side, in which when a positional state of lenses is varied from a wide-angle-end state to a telephoto-end state, the second lens group is moved to an image side, the fourth lens group is moved for compensating a variation in a position of an image plane caused by the movement of the second lens group, and the first lens group and the third lens group are fixed along the optical axis; and an aperture stop disposed at the object side of the third lens group, the third lens group includes a negative sub-lens group having a negative refractive power, and a positive sub-lens group disposed at the image side of the negative sub-lens group with an airspace interposed therebetween, the positive sub-lens group having a positive refractive power, and the following conditional expression (1) is satisfied:

$$0.4 < Da/TL < 0.5 \tag{1}$$

where Da is a distance between the aperture stop and the image plane, and TL is an overall optical length (distance between a lens surface at the most object side in a lens system and the position of the image plane, along the optical axis).

Therefore, the zoom lens according to the present invention can provide both reduction in lens diameters and high optical performance while achieving a high variable magnification ratio. In addition, the imaging apparatus according to the present invention can be small, and takes an image at a high image quality with the high variable magnification ratio by having the above-described zoom lens according to the present invention.

According to inventions disclosed in Claim 2 and 9, a conditional expression (2) $13 < |f3n|/fw < 18$ is satisfied, where f3n is a focal length of the negative sub-lens group disposed in the third lens group, and fw is a focal length of the whole lens system in the wide-angle-end state. Therefore, more reduction in size can be achieved, and an assembly error or the like in manufacturing less affects optical quality.

According to inventions disclosed in Claim 3 and 10, the first lens group includes four lenses including cemented lenses of a negative lens and a positive lens, a positive lens, and a positive lens, sequentially arranged from the object side. Therefore, higher optical performance can be achieved.

According to inventions disclosed in Claim 4 and 11, a conditional expression (3) $2.5 < f1/(fw \cdot ft)^{1/2} < 3.5$ is satisfied, where f1 is a focal length of the first lens group, and ft is a focal length of the whole lens system in the telephoto-end state. Therefore, more reliable optical performance can be provided in addition to the high variable magnification ratio.

According to inventions disclosed in Claim 5 and 12, the second lens group includes four lenses including a meniscus negative lens with a concave thereof facing the image side, a negative lens, a positive lens, and a negative lens, sequentially arranged from the object side. Therefore, aberrations generated at the second lens group can be more reliably corrected, thereby providing higher optical performance.

According to inventions disclosed in Claim 6 and 13, a conditional expression (4) $0.42 < |f2|/(fw \cdot ft)^{1/2} < 0.5$ is satisfied, where f2 is a focal length of the second lens group. Therefore, variation in off-axis aberration caused by the magnification-varying operation can be more reliably corrected.

According to inventions disclosed in Claim 7 and 14, the fourth lens group includes three lenses including a positive lens, a negative lens, and a positive lens, sequentially arranged from the object side. Therefore, the variation in aberrations caused by variation in a position of the object can be reliably corrected.

BRIEF DESCRIPTION OF THE DRAWINGS

FIG. 4 shows the spherical aberration, astigmatism, distortion, and coma in a midpoint-focus state.

FIG. 5 shows the spherical aberration, astigmatism, distortion, and coma in a telephoto-end state.

FIG. 8 shows the spherical aberration, astigmatism, distortion, and coma in the midpoint-focus state.

FIG. 9 shows the spherical aberration, astigmatism, distortion, and coma in the telephoto-end state.

FIG. 12 shows the spherical aberration, astigmatism, distortion, and coma in the midpoint-focus state.

FIG. 13 shows the spherical aberration, astigmatism, distortion, and coma in the telephoto-end state.

BEST MODE FOR CARRYING OUT THE INVENTION

Figure 1:
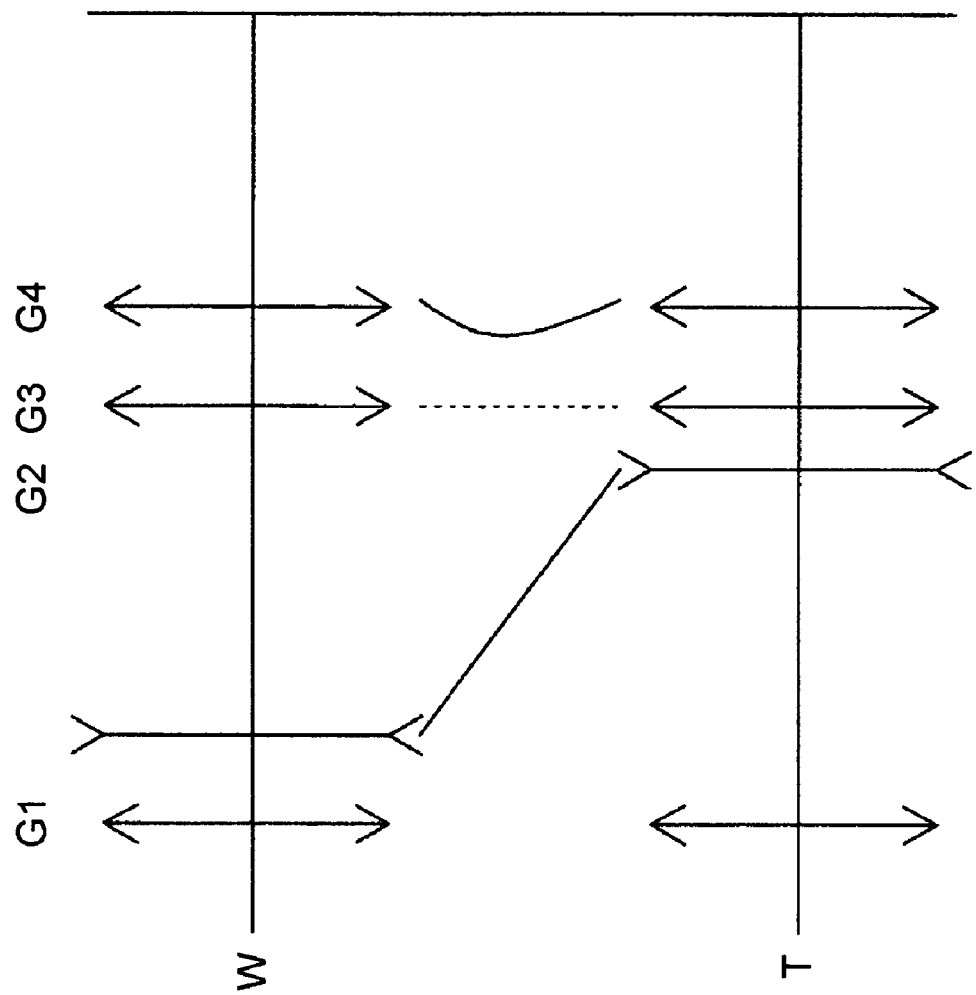
FIG. 1 is a diagram showing an arrangement of refractive powers and showing whether each lens group is movable or not in a magnification-varying operation in a zoom lens according to the present invention.

Now, the best mode for implementing a zoom lens and an imaging apparatus according to the present invention will be described below with reference to the attached drawings.

The zoom lens according to the present invention includes a first lens group having a positive refractive power, a second lens group having a negative refractive power, a third lens group having a positive refractive power, and a fourth lens group having a positive refractive power, sequentially arranged from an object side. When a positional state of lenses is varied from a wide-angle-end state where a focal length of the whole lens system is the shortest to a telephoto-end state where the focal length is the longest, the first and third lens groups are fixed along the optical axis, while the second lens group is moved to an image side for magnification-varying operation and the fourth lens group is moved for compensating a position of an image plane corresponding to the movement of the second lens group and for focusing at a short distance.

On the basis of the above-described configuration, the zoom lens according to the present invention can provide both reduction in lens diameters, and high optical performance, while providing a high variable magnification ratio, as long as the zoom lens includes the following configuration.

To provide the reduction in the lens diameters of the first lens group and the high optical performance, the zoom lens according to the present invention is so configured that:

(A) an aperture stop is disposed at the object side of the third lens group, and (B) the third lens group includes a negative sub-lens group and a positive sub-lens group disposed at the image side of the negative sub-lens group.

The position of the aperture stop is extremely important for providing both the high optical performance and the reduction in size in a well balanced manner.

Since off-axis light beam passing through the lens groups distant from the aperture stop comes away from the optical axis, the lens diameters of the lens groups can be the most easily reduced if the aperture stop is disposed near the center of the lens system. In particular, since the first lens group is the most far from the position of the image plane, the lens diameters are likely increased. Therefore, it is preferable that the aperture stop is disposed slightly at the object side of the center of the lens system.

In addition, a height of the off-axis light beam passing through the movable lens groups are varied largely when the positional state of the lenses is varied. Therefore, the variation in the height of the light beam can be utilized for reliably correcting variation in off-axis aberration which is generated when the positional state of the lenses is varied. In particular, the aberration can be more reliably corrected if at least one movable lens group is disposed at each position at the object side and the image side of the aperture stop.

With the above-described configuration, the present invention can reduce the lens diameters of the first lens group, which may be likely increased, and can provide the high optical performance by disposing the aperture stop at the object side of the third lens group.

Incidentally, according to the present invention, a stop mechanism can be fixed along the optical axis by fixing the position of the aperture stop along the optical axis. Therefore a structure of a lens barrel can be simplified.

In the zoom lens according to the present invention, since the zoom lens may not be reduced in size sufficiently merely by reducing the lens diameters due to improving the disposition of the aperture stop, the zoom lens is further reduced in size by improving the lens configuration of the third lens group.

Heretofore, in an optical system that receives light of an object image by a photoelectric converter, the position of an exit pupil is set at almost infinity. Even in the case of the zoom lens according to the present invention, the position of the exit pupil comes away from the position of the image plane, so that the chief ray reaches the position of the image plane in a manner nearly parallel to the optical axis.

The longer the distance between the aperture stop and the position of the image plane is, the more the refractive power of the lens group disposed at the image side of the aperture stop is reduced. This can decrease an angle formed by the chief ray and the optical axis. When the angle formed by the chief ray and the optical axis is decreased as described above, the off-axis light beam incident on the first lens group comes close to the optical axis, and the first lens group can be reduced in size accordingly.

However, the distance between the aperture stop and the position of the image plane is increased more, the more the position of the aperture stop comes close to the object side, thereby reducing a space for the movement of the second lens group in the magnification-varying operation. Thus, the refractive powers of the first and second lens groups are required to be increased in order to provide a predetermined variable magnification ratio. Owing to this, it is not possible to restrict the variation in the off-axis aberration generated when the positional state of the lenses is varied, thereby not providing high optical performance sufficiently.

In the light of the above-described problems, the zoom lens according to the present invention is so configured that the third lens group includes a negative sub-lens group disposed at the object side and a positive sub-lens group disposed at the image side, so that the angle formed by the chief ray and the optical axis can be decreased without increasing the distance between the aperture stop and the position of the image plane, and the lens diameters of the first lens group can be reduced.

In addition to the above-described configuration, the zoom lens according to the present invention is required to satisfy the following conditional expression (1):

$$0.4 < Da/TL < 0.5 \quad (1)$$

where Da is a distance between the aperture stop and the image plane, and TL is an overall optical length (distance between a lens surface at the most object side in the lens system and the position of the image plane, along the optical axis).

The above-stated conditional expression (1) specifies the disposition of the aperture stop in the zoom lens according to the present invention.

When the value is above the upper limit of the conditional expression (1) (i.e., the position of the aperture stop comes close to the object side), the refractive powers of the first and second lens groups are increased. Therefore, it may be difficult to reliably correct the variation in the off-axis aberration generated when the positional state of the lenses is varied.

On the other hand, when the value is below the lower limit of the conditional expression (1) (i.e., the position of the aperture stop comes close to the image side), the off-axis light beam passing through the first lens group comes away from the optical axis since the position of the aperture stop comes close to the image side. Therefore, the lens diameters may not be reduced sufficiently.

The zoom lens according to the present invention is configured that the third lens group includes the negative sub-lens group and the positive sub-lens group as described above, and in addition to this, in order to provide stable optical quality without being influenced by more reduction in size, an assembly error in manufacturing, and the like, it is preferable to satisfy the following conditional expression (2):

$$13 < |f3n|/fw < 18 \quad (2)$$

where f3n is a focal length of the negative sub-lens group disposed in the third lens group, and fw is a focal length in the whole lens system in the wide-angle-end state.

The above-stated conditional expression (2) specifies the refractive power of the negative sub-lens group disposed in the third lens group.

When the value is above the upper limit of the conditional expression (2), the angle formed by the chief ray and the optical axis is increased. As a result, the off-axis light beam passing through the first lens group comes away from the optical axis. Therefore, the lens diameters may not be reduced sufficiently.

When the value is below the lower limit of the conditional expression (2), the optical performance may be considerably deteriorated even when a slight eccentricity is generated between the negative sub-lens group and the positive sub-lens group of the third lens group in manufacturing. Therefore, it may be difficult to provide the stable optical quality.

In order to provide higher optical performance, the zoom lens according to the present invention is preferably configured that the first lens group includes four lenses including cemented lenses of a negative lens and a positive lens, and two positive lenses, sequentially arranged from the object side.

Since on-axis light beam impinges on the first lens group with a wide diameter particularly in the telephoto-end state, negative spherical aberration is likely generated. In addition, since the incident off-axis light beam comes away from the optical axis, the off-axis aberration is likely generated.

In the zoom lens according to the present invention, the negative spherical aberration and the on-axis chromatic aberration can be reliably corrected by disposing the cemented lenses of the negative lens and the positive lens at the most object side in the first lens group. While a conventional positive-negative-positive-positive four-group zoom lens is so configured that the first lens group includes cemented lenses and a positive lens at the image side of the cemented lenses, the zoom lens according to the present invention has two positive lenses disposed at the image side of the cemented lenses. Therefore, the negative spherical aberration is not generated in the telephoto-end state while providing the high variable magnification ratio, and variation in coma caused by variation in an angle of view can be reliably corrected, thereby providing higher optical performance.

In order to provide more preferable optical performance in addition to the high variable magnification ratio, the zoom lens according to the present invention is preferable to satisfy the following conditional expression (3):

$$2.5 < f1/(fw \cdot ft)^{1/2} < 3.5 \qquad (3)$$

where f1 is a focal length of the first lens group, and ft is a focal length in the whole lens system in the telephoto-end state.

The above-stated conditional expression (3) specifies a focal length of the first lens group.

The value above the upper limit of the conditional expression (3) is not preferable since the overall optical length is increased excessively.

When the value is below the lower limit of the conditional expression (3), the coma generated at the periphery of a screen in the telephoto-end state may not be corrected reliably. Therefore, the higher optical performance may not be provided sufficiently.

In the zoom lens according to the present invention, in order to more reliably correct the aberrations generated at the second lens group and to provide higher optical performance, it is preferable that the second lens group includes four lenses including a meniscus positive lens with a concave thereof facing the image side, a negative lens, a positive lens, and a negative lens, sequentially arranged from the object side.

Since the second lens group varies the magnification, it is important to reliably correct the aberrations generated at the second lens group for providing higher optical performance. In the present invention, the meniscus negative lens with the concave thereof facing the image side and disposed at the most object side in the second lens group corrects the variation in the coma caused by the variation in the angle of view in the wide-angle-end state, and the triplet lenses disposed at the image side of the meniscus negative lens reliably corrects the on-axis aberration. Therefore, the corrections of the aberrations can be clearly divided into those lenses to provide preferable focusing performance.

Incidentally, in the zoom lens according to the present invention, since there is serious deterioration in the optical performance due to the eccentricity between the positive lens and the negative lens disposed at the image side of the positive lens, the lenses are cemented. Accordingly, the eccentricity between the two lenses is unlikely generated in manufacturing, thereby providing the stable optical quality.

In the zoom lens according to the present invention, since only the second lens group is the negative lens group, it is important that the refractive power of the second lens group is appropriately set in order to more reliably correct the variation in the off-axis aberration caused by the magnification-varying operation, and it is preferable to satisfy the following conditional expression (4):

$$0.42 < |f2|/(fw \cdot ft)^{1/2} < 0.5 \qquad (4)$$

where f2 is a focal length of the second lens group.

The above-stated conditional expression (4) specifies a focal length of the second lens group.

When the value is above the upper limit of the conditional expression (4), the off-axis light beam passing through the second lens group further comes away from the optical axis. As a result, it may be difficult to reliably correct the coma generated at the periphery of the screen in the wide-angle-end state.

When the value is below the lower limit of the conditional expression (4), it may be difficult to reliably correct the variation in the off-axis aberration generated when the positional state of the lenses is varied.

In the zoom lens according to the present invention, it is preferable that the fourth lens group includes a positive lens with a convex thereof facing the object side, a negative lens with a concave thereof facing the image side, and a positive lens with a convex thereof facing the object side, the lenses being sequentially arranged from the object side, in order to reliably correct the aberrations caused by the variation in the position of the object.

The triplet configuration allows the off-axis aberration and on-axis aberration to be corrected together, thereby reliably correcting the variation in the aberrations generated when the position of the object is varied.

Note that in the zoom lens according to the present invention, a glass member having high extraordinary dispersion is preferably used in the first lens group to prevent the generation of chromatic aberration more reliably. In particular, secondary dispersion generated at the center of the screen in the telephoto-end state can be reliably corrected by forming the positive lens of the cemented lenses, out of the lenses constituting the first lens group, with a glass member having the high extraordinary dispersion.

In addition, it is possible to reliably correct chromatic aberration of magnification generated at the periphery of the screen in the telephoto-end state by forming one of the two positive lenses disposed at the image side in the first lens group with a glass member having low dispersion with the Abbe number thereof being above 65. If both the two positive lenses employ the glass member having the low dispersion, the chromatic aberration of magnification can be more reliably corrected.

In the zoom lens according to the present invention, an image can be shifted by shifting one of lens groups of the lens system or a part of the lenses of the single lens group in a direction substantially perpendicular to the optical axis. In particular, when one of the negative sub-lens group and the positive sub-lens group of the third lens group is shifted in the direction substantially perpendicular to the optical axis, the image can be shifted with the least deterioration in the optical performance. When a detecting system for detecting vibration of a camera, a drive system for shifting the above-described lens group, and a control system for providing a shift amount according to the output of the detecting system are combined together, the combination can be served as a vibration-proof optical system.

In the zoom lens according to the present invention, higher optical performance can be achieved by using an aspherical lens. In particular, higher optical performance can be achieved in terms of center performance by employing the aspherical surface in the final lens group. In addition, the variation in the coma due to the angle of view generated in the wide-angle-end state can be reliably corrected by using the aspherical lens in the second lens group.

Further, it is obvious that the high optical performance can be provided by employing a plurality of aspherical surfaces in the single optical system.

In addition, it is also obvious that a low pass filter can be disposed for preventing generation of moire fringes at the image side in the lens system, and an infrared cut-off filter can be disposed in accordance with spectral sensitivity characteristics of a light-receiving element.

In addition, a prism having a dichroic mirror may be disposed at the image side of the optical system, so that the light beam is divided into three RGB colors to be used for a three-imager imaging optical system that receives light by three imagers (light-receiving elements).

Now, embodiments, and numerical examples in which specific numerical values are applied to the embodiments of the zoom lens according to the present invention, will be described below.

Note that, while the aspherical surface is used in each embodiment, the shape of the aspherical surface is represented by Equation 1 as follows:

$$X = cy^2/(1+(1-(1+\kappa)c^2y^2)^{1/2}) + Ay^4 + By^6 + \ldots \quad [\text{Equation 1}]$$

where y is a height from the optical axis, x is an amount of sag, c is a curvature, κ is a conic constant, and A, B, ... is an aspherical coefficient.

FIG. 1 shows distribution of the refractive powers of each embodiment of the zoom lens according to the present invention. There are disposed a first lens group G1 having a positive refractive power, a second lens group G2 having a negative refractive power, a third lens group G3 having a positive refractive power, and a fourth lens group G4 having a positive refractive power, sequentially arranged from the object side. In magnification varying from the wide-angle-end state to the telephoto-end state, the second lens group G2 is moved to the image side so that an airspace between the first lens group G1 and the second lens group G2 is increased and an airspace between the second lens group G2 and the third lens group G3 is decreased. At this time, the first lens group G1 and the third lens group G3 are fixed, while the forth lens group G4 is moved to correct the variation in the position of the image plane caused by the movement of the second lens group G2, and also is moved to the object side when focusing at a short distance.

Figure 2:
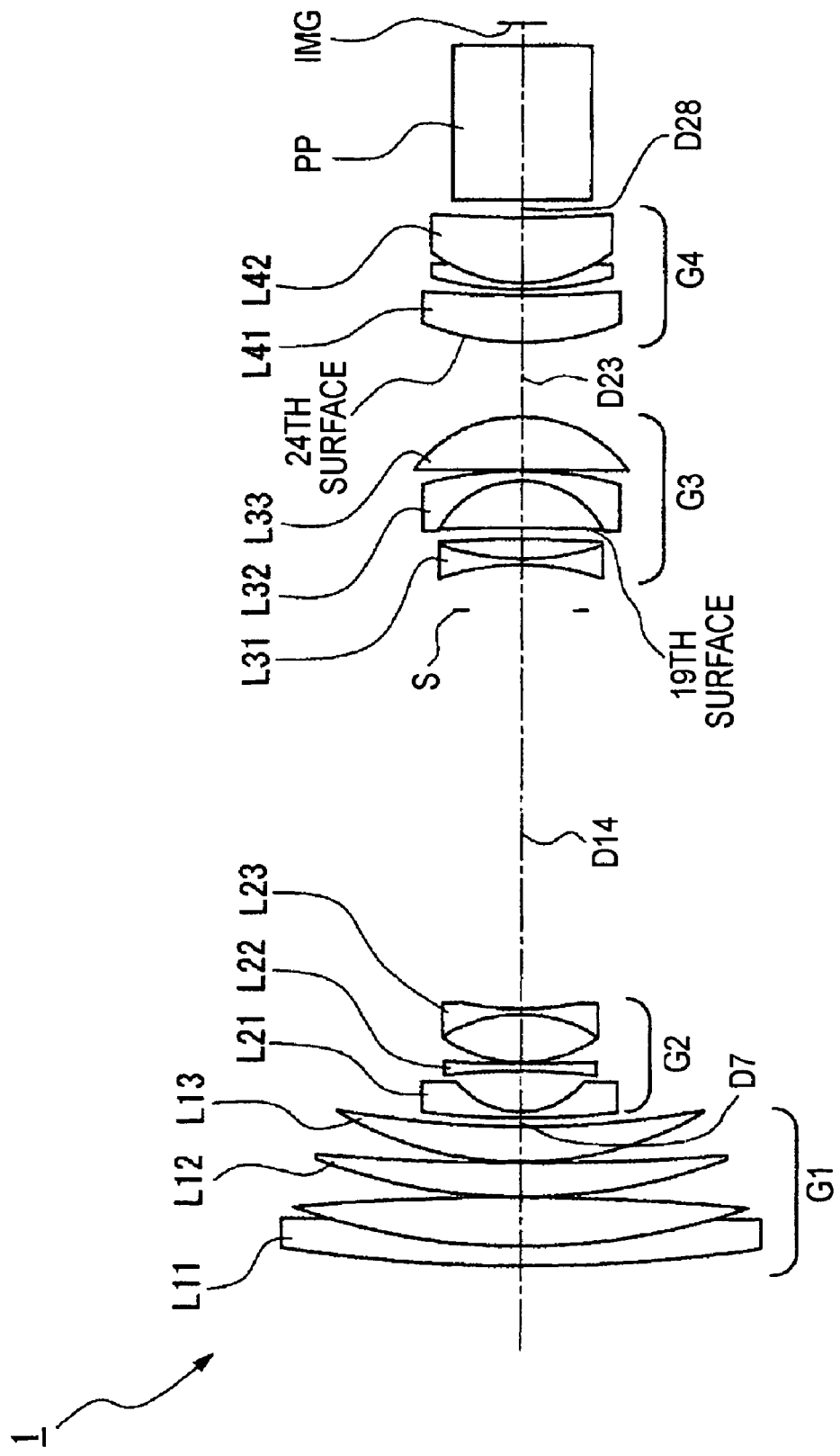
FIG. 2 is an illustration showing a lens configuration of a zoom lens according to a first embodiment of the present invention.

FIG. 2 is an illustration showing a lens configuration of a zoom lens according to a first embodiment of the present invention. The first lens group G1 includes cemented lenses L11 of a meniscus negative lens with a convex thereof facing the object side and a positive lens with a convex thereof facing the object side, a positive lens L12 with a convex thereof facing the object side, and a positive lens L13 with a convex thereof facing the object side. The second lens group G2 includes a meniscus negative lens L21 with a concave thereof facing the image side, a biconcave negative lens L22, and cemented lenses L23 of a biconvex lens and a biconcave lens. The third lens group G3 includes cemented negative lenses L31 of a biconcave lens and a positive lens with a convex thereof facing the object side, cemented lenses L32 of a biconvex lens with an aspherical surface at the object side and a negative lens with a concave thereof facing the object side, and a positive lens L33 with a convex thereof facing the image side. The fourth lens group G4 includes a positive lens L41 with an aspherical convex thereof facing the object side, and cemented lenses L42 of a negative lens with a concave thereof facing the image side and a positive lens with a convex thereof facing the object side.

In the zoom lens 1 according to the first embodiment, the cemented negative lenses L31 serve as the negative sub-lens group, and the cemented lens L32 and the positive lens L33 serve as the positive sub-lens group, the lenses being disposed in the third lens group G3.

In addition, an aperture stop S, which is fixed along the optical axis, is disposed near the object side of the third lens group G3, and a color separation prism PP, which is fixed along the optical axis, is disposed at the image side of the fourth lens group G4.

Table 1 shows specifications of Numeric Example 1 in which specific numerical values are applied to the first embodiment. In Table 1 and the following specification tables, Surface Number represents an i-th surface counted from the object side, Curvature Radius represents a curvature radius of the i-th surface, Surface Distance represents an on-axis distance between the i-th surface and an i+1-th surface, Refractive Index represents a refractive index relative to the d-line (λ=587.6 nm) of a glass member having the i-th surface at the object side, and Abbe Number represents an Abbe number relative to the d-line of the glass member having the i-th surface at the object side. Note that the curvature radius 0 means a plane, and the surface distance Di means that the on-axis distance between the i-th surface and the i+1-th surface is variable.

TABLE 1

| Surface Number | Curvature Radius | Surface Distance | Refractive Index | Abbe Number | |
|---|---|---|---|---|---|
| 1: | 39.2166 | 0.490 | 1.80518 | 25.4 | |
| 2: | 16.7662 | 1.224 | 1.49700 | 81.6 | |
| 3: | −65.2680 | 0.049 | | | |
| 4: | 14.0159 | 0.805 | 1.60300 | 65.5 | |
| 5: | 53.5272 | 0.049 | | | |
| 6: | 8.9488 | 0.869 | 1.45600 | 90.3 | |
| 7: | 21.2457 | (D7) | | | |
| 8: | 14.2665 | 0.171 | 1.77250 | 49.6 | |
| 9: | 1.9759 | 1.060 | | | |
| 10: | −9.6223 | 0.147 | 1.88300 | 40.8 | |
| 11: | 16.5840 | 0.049 | | | |
| 12: | 3.2143 | 1.204 | 1.75520 | 27.5 | |
| 13: | −3.4351 | 0.147 | 1.88300 | 40.8 | |
| 14: | 7.0292 | (D14) | | | |
| 15: | 0.0000 | 1.258 | | | (Aperture Stop) |
| 16: | −6.4419 | 0.147 | 1.77520 | 27.5 | |
| 17: | 6.1177 | 0.490 | 1.92286 | 18.9 | |
| 18: | −28.9059 | 0.147 | | | |
| 19: | 22.9615 | 1.224 | 1.58913 | 61.3 | |
| 20: | −2.3573 | 0.208 | 1.88300 | 40.8 | |
| 21: | −9.1346 | 0.073 | | | |
| 22: | −682.9045 | 1.322 | 1.49700 | 81.6 | |
| 23: | −3.3001 | (D23) | | | |
| 24: | 5.6392 | 1.224 | 1.69350 | 53.3 | |
| 25: | 59.9742 | 0.132 | | | |
| 26: | 8.3984 | 0.147 | 1.80518 | 25.4 | |
| 27: | 3.6547 | 1.664 | 1.48749 | 70.4 | |
| 28: | 48.9503 | (D28) | | | |
| 29: | 0.0000 | 3.806 | 1.51680 | 64.2 | |
| 30: | 0.0000 | (Bf) | | | |

In the zoom lens 1 according to the first embodiment, along with the variation in the positional state of the lenses from the wide-angle-end state to the telephoto-end state, a surface distance D7 between the first lens group G1 and the second lens group G2, a surface distance D14 between the second lens group G2 and the aperture stop S, a surface distance D23 between the third lens group G3 and the fourth lens group G4, and a surface distance D28 between the fourth lens group G4 and the color separation prism PP are varied. Now, Table 2 shows values of the surface distances in the wide-angle-end state, in the midpoint-focus state which is between the wide-angle-end state and the telephoto-end state, and in the telephoto-end state according to Numerical Example 1 together with each focal length f, F-number Fno., and angle of view 2ω.

TABLE 2

| f | 1.000~9.430~21.047 | | |
|---|---|---|---|
| FNO | 1.65~2.19~2.88 | | |
| 2ω | 60.34~6.70~3.00° | | |
| D7 | 0.184 | 8.319 | 9.636 |
| D14 | 10.033 | 1.898 | 0.581 |
| D23 | 1.850 | 0.755 | 1.958 |
| D28 | 0.437 | 1.532 | 0.329 |
| Bf | 0.566 | 0.566 | 0.566 |

In the zoom lens 1 according to the first embodiment, lens surfaces of a 19th surface and a 24th surface are aspherical. Now, Table 3 shows aspherical coefficients A, B, C, and D at 4th, 6th, 8th, and 10th orders of the above-described surfaces according to Numerical Example 1, together with each conic constant κ. Note that in Table 3 and the following tables showing the aspherical coefficients, "E-i" represents an exponent based on 10, namely, represents "10-i". For instance, "0.12345E-05" represents "$0.12345 \times 10^{-5}$".

TABLE 3

| 19th Surface | κ = −2.000000 | A = −0.347142E−02 | B = −0.447320E−03 |
|---|---|---|---|
| | | C = 0.545089E−04 | D = −0.255876E−04 |
| 24th Surface | κ = −0.540914 | A = −0.360175E−03 | B = −0.558377E−05 |
| | | C = −0.185402E−06 | D = 0.316210E−06 |

Table 4 shows values corresponding to the conditional expressions according to Numerical Example 1.

TABLE 4 f3n = −17.671
f1 = 14.045
f2 = −2.195
(1) Da/TL = 0.471
(2) |f3n|/fw = 17.671
(3) f1/(fw · ft)$^{1/2}$ = 3.061
(4) |f2|/(fw · ft)$^{1/2}$ = 0.479

Figure 3:
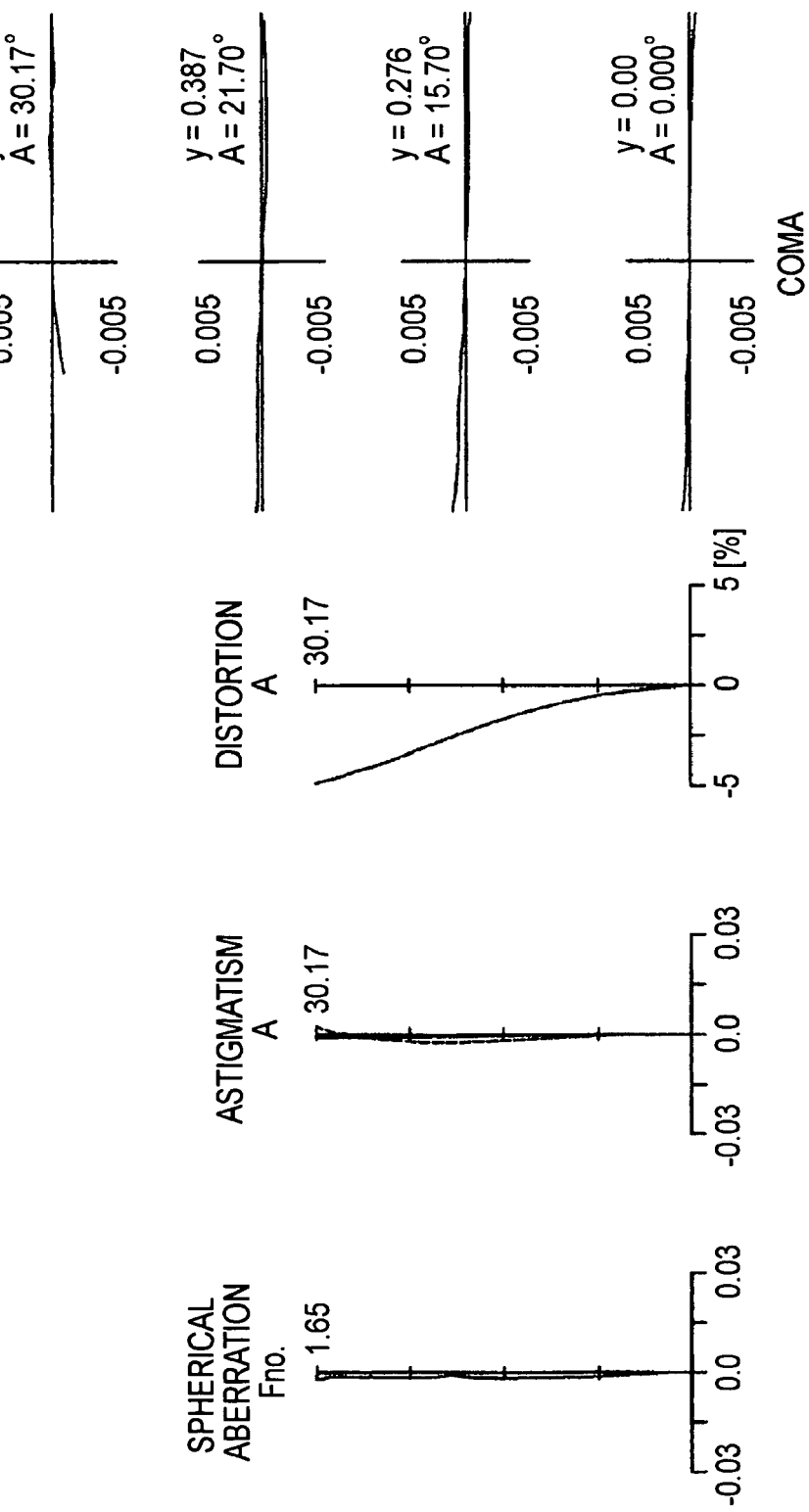
FIGS. 3, 4 and 5 are aberration diagrams of Numerical Example 1 in which specific numerical values are applied to the zoom lens according to the first embodiment of the present invention, FIG. 3 showing spherical aberration, astigmatism, distortion, and coma in a wide-angle-end state.
Figure 4:
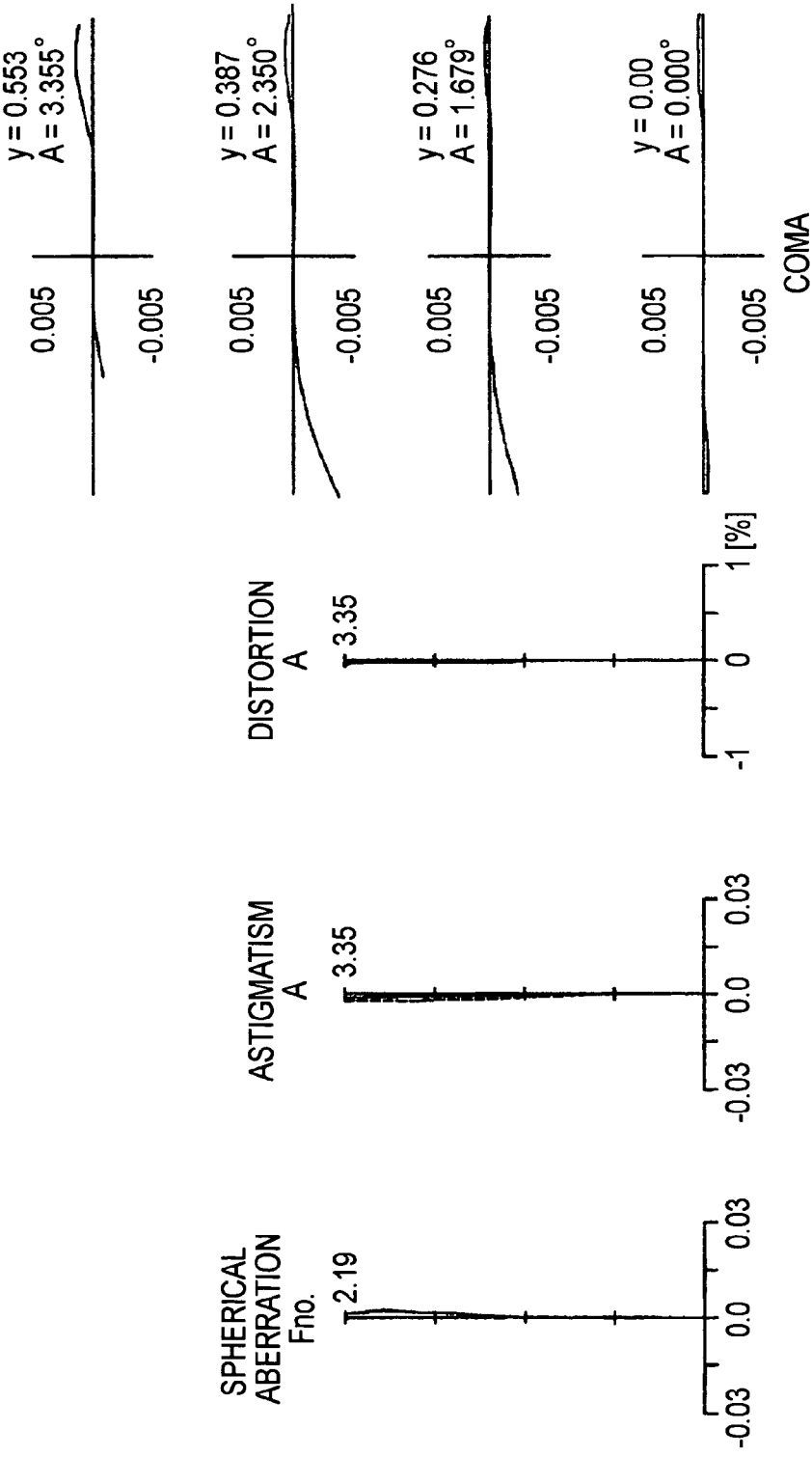
Figure 5:
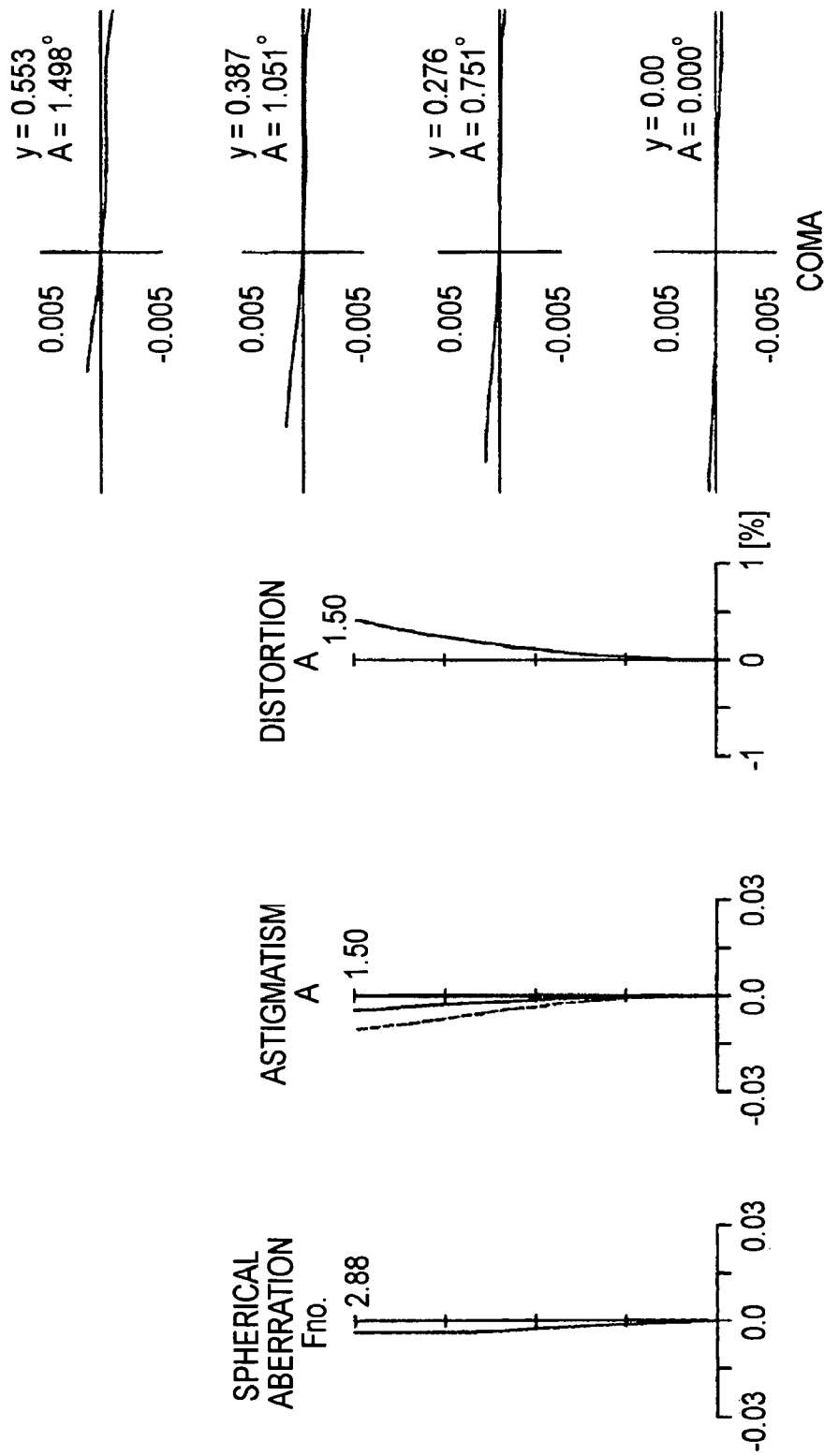

FIGS. 3 to 5 are aberration diagrams while an object at infinity is in focus according to Numerical Example 1, in which FIG. 3 shows an aberration diagram in the wide-angle-end state (f=1.000), FIG. 4 shows an aberration diagram in the midpoint-focus state (f=9.430), and FIG. 5 shows an aberration diagram in the telephoto-end state (f=21.047).

In each of the aberration diagrams of FIGS. 3 to 5, a solid line in a spherical aberration diagram shows the spherical aberration; and a solid line in an astigmatism diagram shows a sagittal image plane and a broken line shows a meridional image plane. In coma diagrams, each A shows an angle of view and y shows an image height.

As shown in Table 4 and the aberration diagrams, it is obvious that Numerical Example 1 satisfies the conditional expressions (1) to (4), the aberrations are reliably corrected, and excellent focusing performance is provided.

Figure 6:
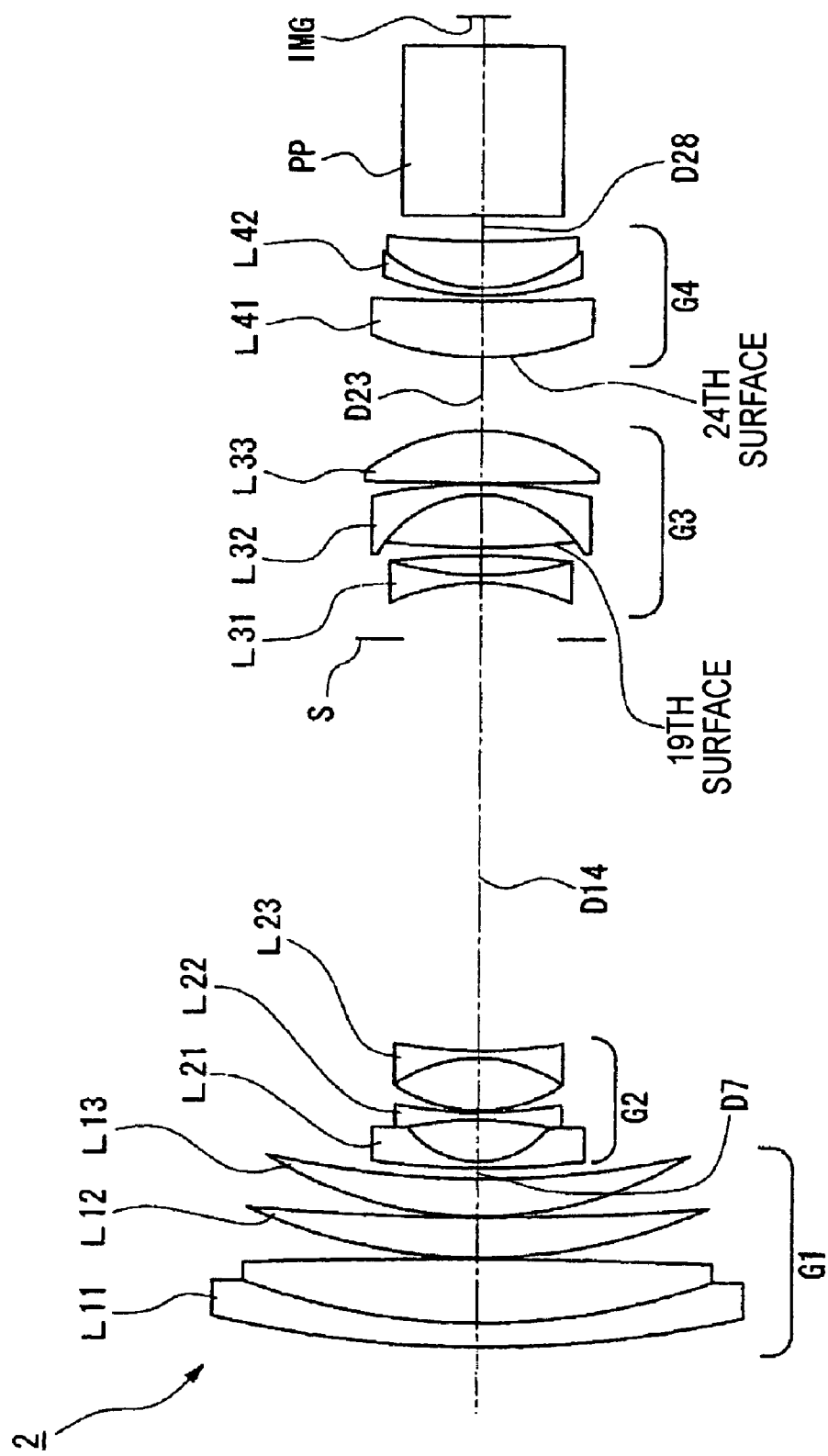
FIG. 6 is an illustration showing a lens configuration of a zoom lens according to a second embodiment of the present invention.

FIG. 6 is an illustration showing a lens configuration of a zoom lens according to a second embodiment of the present invention. The first lens group G1 includes the cemented lenses L11 of the meniscus negative lens with the convex thereof facing the object side and the positive lens with the convex thereof facing the object side, the positive lens L12 with the convex thereof facing the object side, and the positive lens L13 with the convex thereof facing the object side. The second lens group G2 includes the meniscus negative lens L21 with the concave thereof facing the image side, the biconcave negative lens L22, and the cemented lenses L23 of the biconvex lens and the biconcave lens. The third lens group G3 includes the cemented negative lenses L31 of the biconcave lens and the positive lens with the convex thereof facing the object side, the cemented lenses L32 of the biconvex lens with the aspherical surface at the object side and the negative lens with the concave thereof facing the object side, and the positive lens L33 with the convex thereof facing the image side. The fourth lens group G4 includes the positive lens L41 with the aspherical convex thereof facing the object side, and the cemented lenses L42 of the negative lens with the concave thereof facing the image side and the positive lens with the convex thereof facing the object side.

In the zoom lens 2 according to the second embodiment, the cemented negative lenses L31 serve as the negative sub-lens group, and the cemented lenses L32 and the positive lens L33 serve as the positive sub-lens group, the lenses being disposed in the third lens group G3.

In addition, an aperture stop S, which is fixed along the optical axis, is disposed close to the object side of the third lens group G3, and the color separation prism PP, which is fixed along the optical axis, is disposed at the image side of the fourth lens group G4.

Table 5 shows specifications of Numeric Example 2 in which specific numerical values are applied to the second embodiment.

TABLE 5

| Surface Number | Curvature Radius | Surface Distance | Refractive Index | Abbe Number |
|---|---|---|---|---|
| 1: | 26.2087 | 0.490 | 1.84666 | 23.8 |
| 2: | 14.7706 | 1.469 | 1.49700 | 81.6 |
| 3: | −114.5260 | 0.049 | | |
| 4: | 12.5245 | 0.876 | 1.49700 | 81.6 |
| 5: | 54.2087 | 0.049 | | |
| 6: | 8.8958 | 0.837 | 1.49700 | 81.6 |
| 7: | 20.8989 | (D7) | | |
| 8: | 18.3065 | 0.171 | 1.75500 | 52.3 |
| 9: | 1.9052 | 0.938 | | |
| 10: | −11.0709 | 0.147 | 1.88300 | 40.8 |
| 11: | 8.8367 | 0.049 | | |
| 12: | 3.2037 | 1.178 | 1.75520 | 27.5 |
| 13: | −3.1296 | 0.147 | 1.88300 | 40.8 |
| 14: | 10.0915 | (D14) | | |
| 15: | 0.0000 | 1.263 | | (Aperture Stop) |
| 16: | −4.2208 | 0.147 | 1.75520 | 27.5 |
| 17: | 7.7645 | 0.495 | 1.92286 | 18.9 |
| 18: | −9.9555 | 0.147 | | |
| 19: | 12.1878 | 1.202 | 1.58913 | 61.3 |
| 20: | −2.6827 | 0.208 | 1.80100 | 35.0 |
| 21: | −11.7616 | 0.073 | | |
| 22: | 143.7374 | 1.155 | 1.49700 | 81.6 |
| 23: | −4.0930 | (D23) | | |
| 24: | 6.3850 | 1.224 | 1.69350 | 53.3 |
| 25: | 82.9604 | 0.122 | | |
| 26: | 6.0637 | 0.147 | 1.84666 | 23.8 |
| 27: | 3.3544 | 1.102 | 1.48749 | 70.4 |
| 28: | 48.9615 | (D28) | | |

TABLE 5-continued

| Surface Number | Curvature Radius | Surface Distance | Refractive Index | Abbe Number |
|---|---|---|---|---|
| 29: | 0.0000 | 3.807 | 1.51680 | 64.2 |
| 30: | 0.0000 | (Bf) | | |

In the zoom lens 2 according to the second embodiment, along with the variation in the positional state of the lenses from the wide-angle-end state to the telephoto-end state, a surface distance D7 between the first lens group G1 and the second lens group G2, a surface distance D14 between the second lens group G2 and the aperture stop S, a surface distance D23 between the third lens group G3 and the fourth lens group G4, and a surface distance D28 between the fourth lens group G4 and the color separation prism PP are varied. Now, Table 6 shows values of the surface distances in the wide-angle-end state, in the midpoint-focus state which is between the wide-angle-end state and the telephoto-end state, and in the telephoto-end state according to Numerical Example 2, together with each focal length f, F-number Fno., and angle of view 2ω.

TABLE 6

| f | 1.000~8.860~21.057 | | |
|---|---|---|---|
| FNO | 1.65~2.18~2.88 | | |
| 2ω | 60.31~7.14~2.99° | | |
| D7 | 0.184 | 7.703 | 9.029 |
| D14 | 9.457 | 1.938 | 0.612 |
| D23 | 1.686 | 0.700 | 2.017 |
| D28 | 0.586 | 1.572 | 0.255 |
| Bf | 0.567 | 0.567 | 0.567 |

In the zoom lens 2 according to the second embodiment, the lens surfaces of the 19th surface and the 24th surface are aspherical. Now, Table 7 shows aspherical coefficients A, B, C, and D at 4th, 6th, 8th, and 10th orders of the above-described surfaces according to Numerical Example 2, together with each conic constant κ.

TABLE 7

| 19th Surface | κ = −0.160601 | A = −0.218930E−02 | B = −0.985084E−04 |
| | | C = 0.145786E−04 | D = −0.215771E−05 |
| 24th Surface | κ = −0.658853 | A = −0.457647E−03 | B = −0.105701E−04 |
| | | C = 0.624990E−05 | D = −0.587955E−06 |

Table 8 shows values corresponding to the conditional expressions according to Numerical Example 2.

TABLE 8 f3n = −16.899
f1 = 13.316
f2 = −2.122
(1) Da/TL = 0.465
(2) |f3n|/fw = 16.899
(3) f1/(fw · ft)$^{1/2}$ = 2.902
(4) |f2|/(fw · ft)$^{1/2}$ = 0.462

Figure 7:
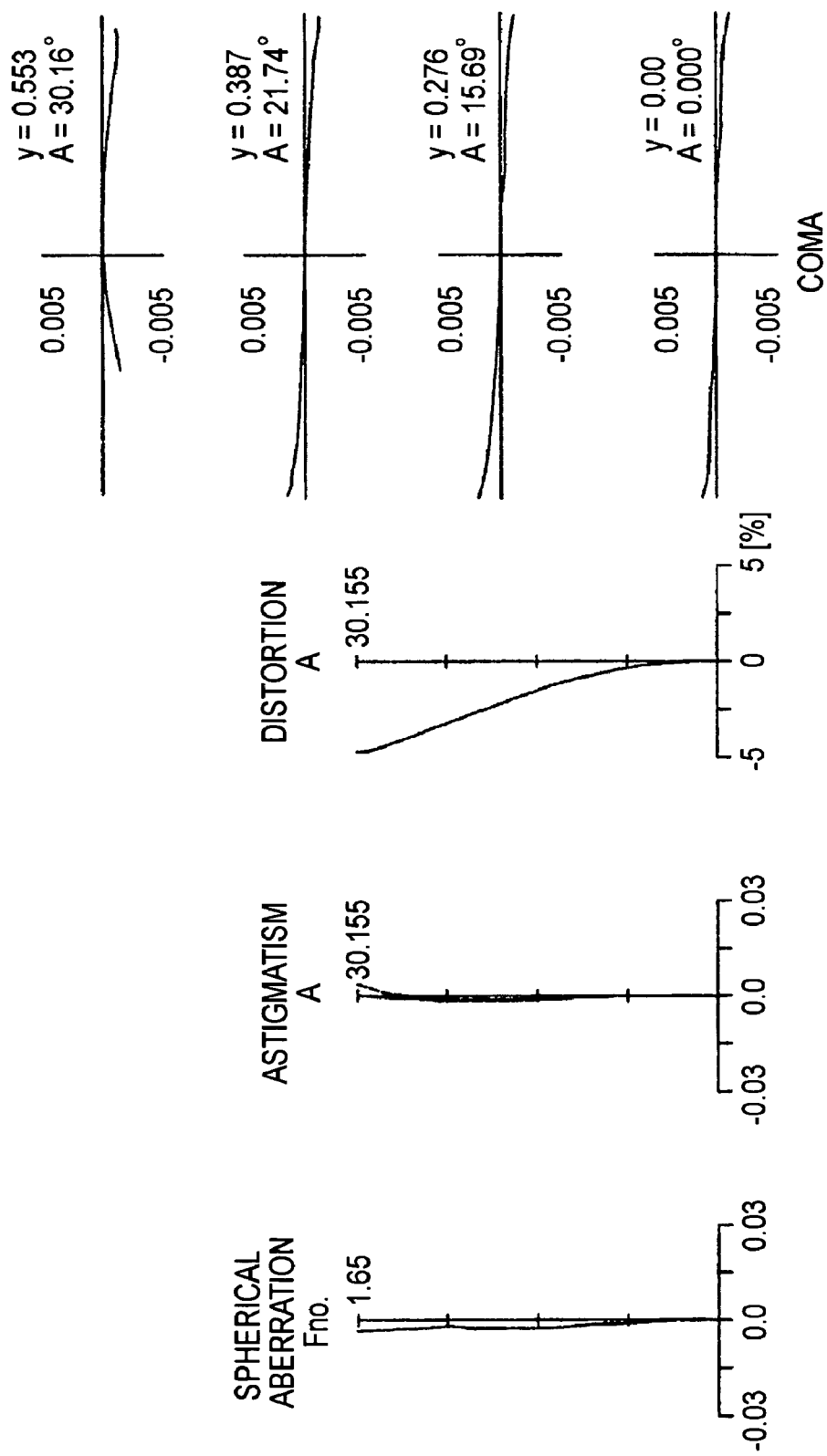
FIGS. 7, 8 and 9 are aberration diagrams of Numerical Example 2 in which specific numerical values are applied to the zoom lens according to the second embodiment of the present invention, FIG. 7 showing the spherical aberration, astigmatism, distortion, and coma in the wide-angle-end state.
Figure 8:
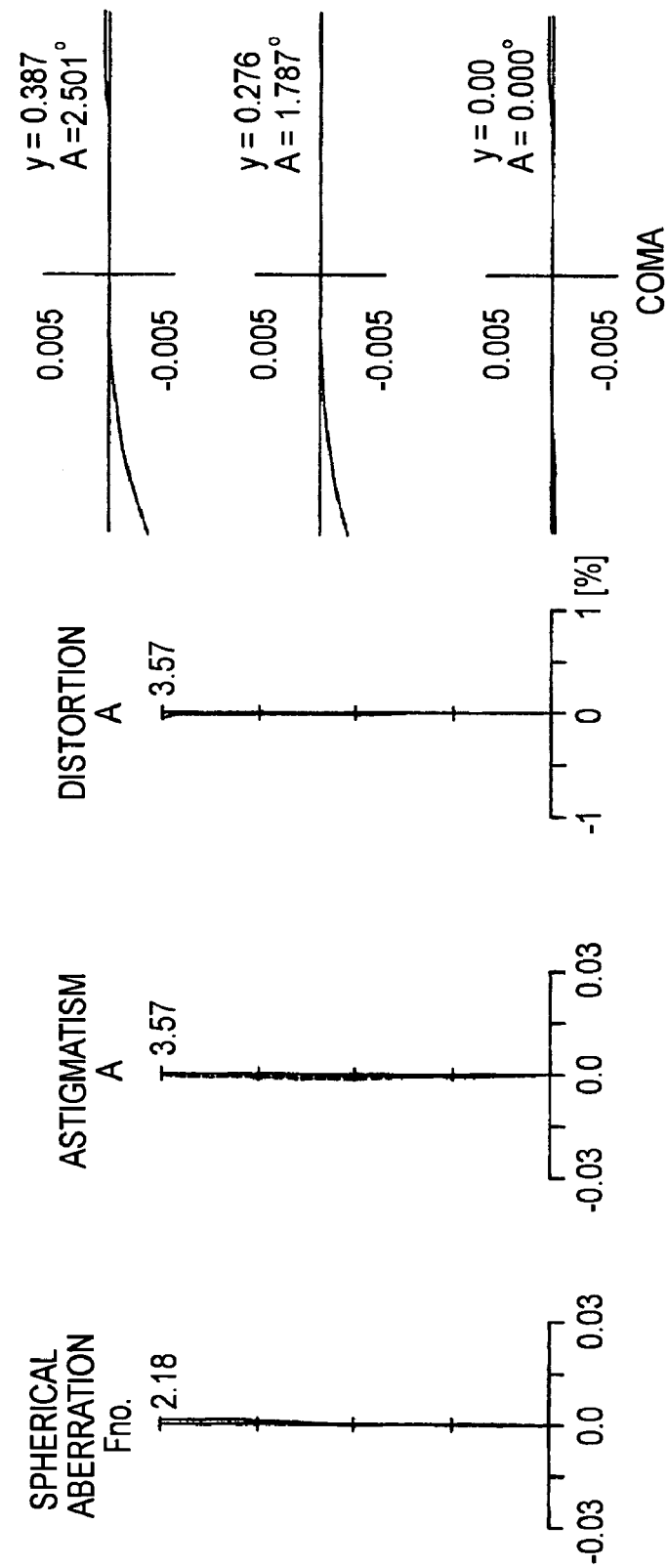
Figure 9:
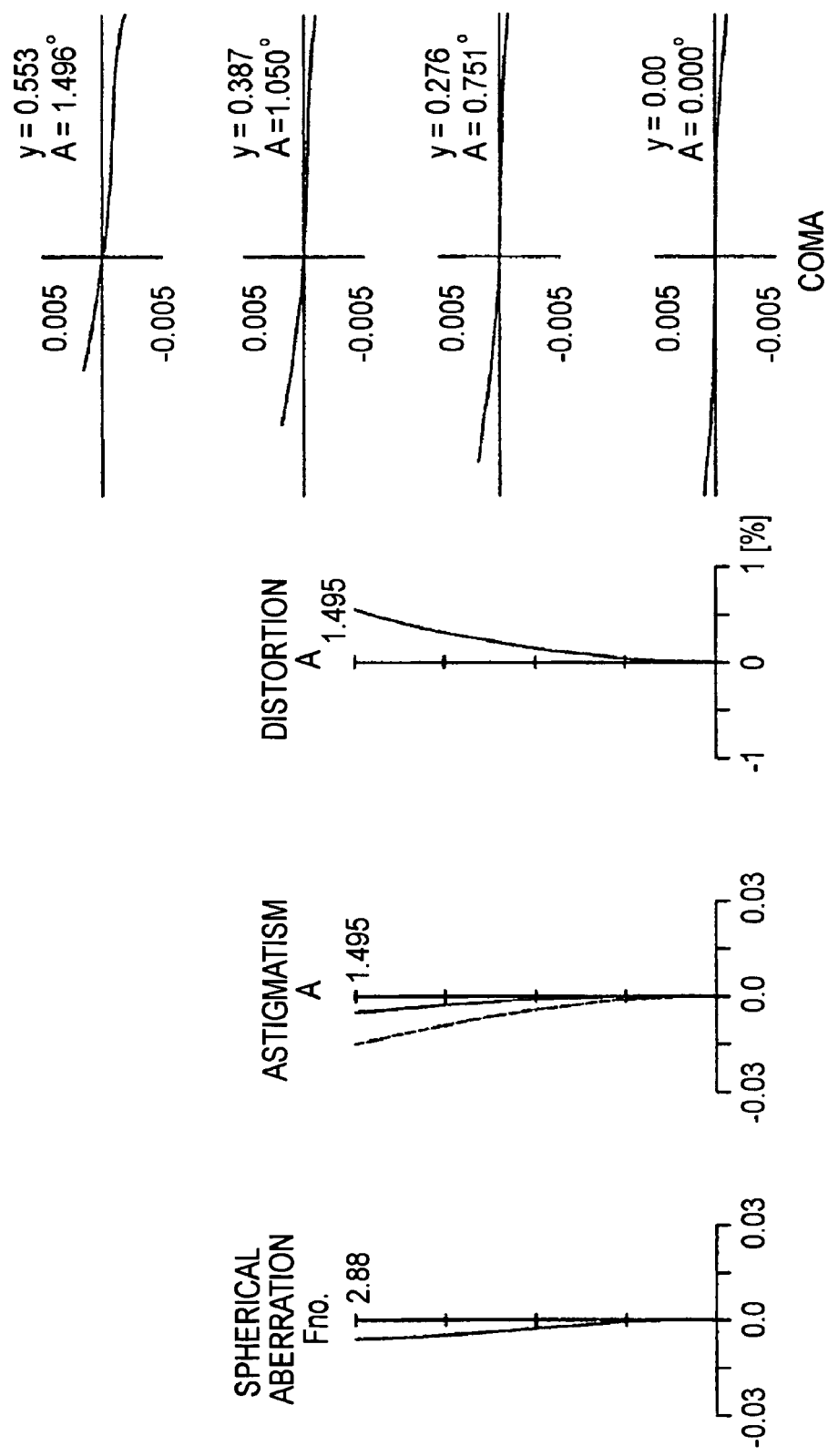

FIGS. 7 to 9 are aberration diagrams while an object at infinity is in focus according to Numerical Example 2, in which FIG. 7 shows an aberration diagram in the wide-angle-end state (f=1.000), FIG. 8 shows an aberration diagram in the midpoint-focus state (f=8.860), and FIG. 9 shows an aberration diagram in the telephoto-end state (f=21.057).

In each of the aberration diagrams of FIGS. 7 to 9, a solid line in a spherical aberration diagram shows the spherical aberration; and a solid line in an astigmatism diagram shows the sagittal image plane and a broken line shows the meridional image plane. In coma diagrams, each A shows an angle of view and y shows an image height.

As shown in Table 8 and the aberration diagrams, it is obvious that Numerical Example 2 satisfies the conditional expressions (1) to (4), the aberrations are reliably corrected, and excellent focusing performance is provided.

Figure 10:
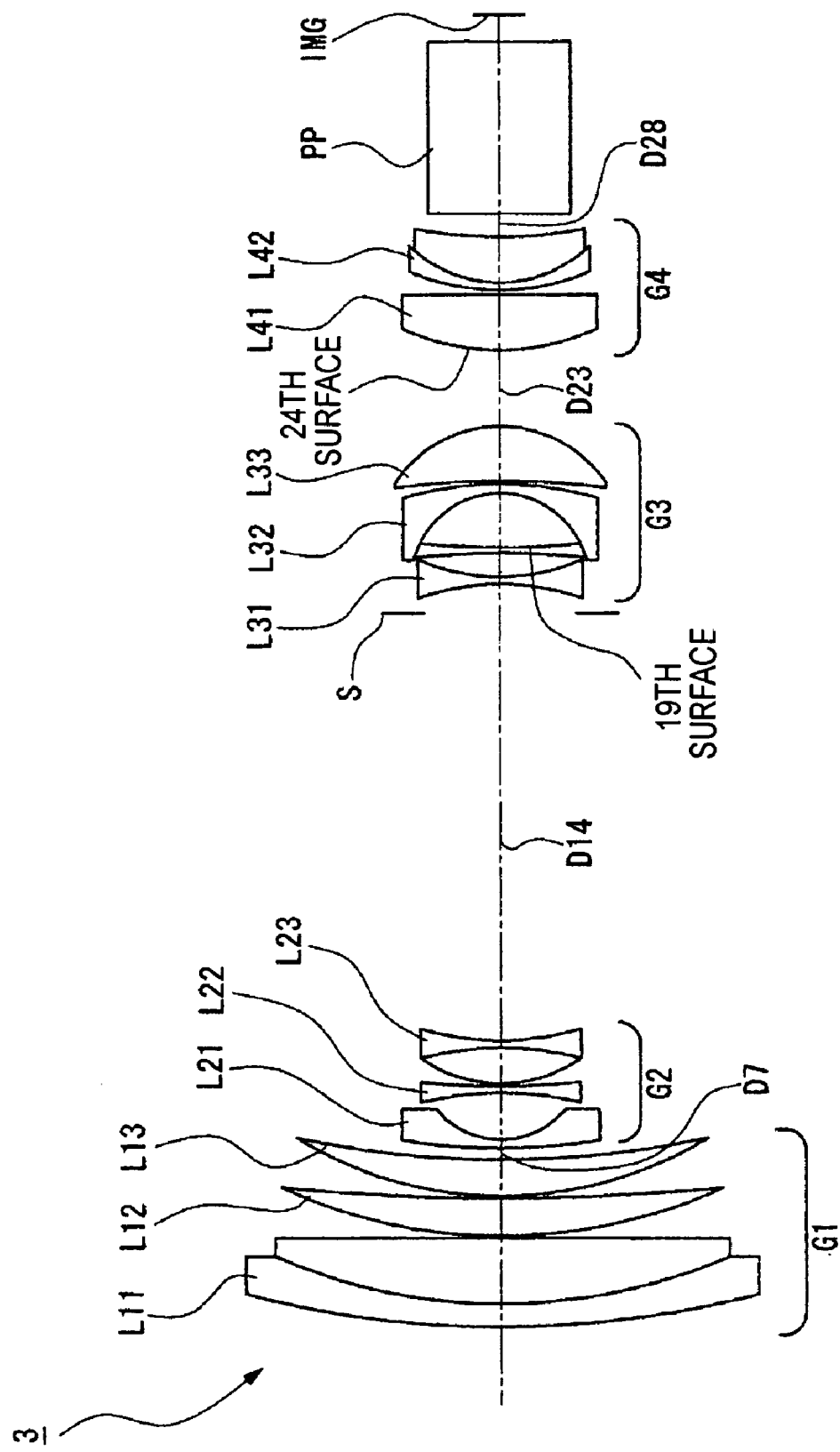
FIG. 10 is an illustration showing a lens configuration of a zoom lens according to a third embodiment of the present invention.

FIG. 10 is an illustration showing a lens configuration of a zoom lens according to a third embodiment of the present invention. The first lens group G1 includes the cemented lenses L11 of the meniscus negative lens with the convex thereof facing the object side and the positive lens with the convex thereof facing the object side, the positive lens L12 with the convex thereof facing the object side, and the positive lens L13 with the convex thereof facing the object side. The second lens group G2 includes the meniscus negative lens L21 with the concave thereof facing the image side, the biconcave negative lens L22, and the cemented lenses L23 of the biconvex lens and the biconcave lens. The third lens group G3 includes the cemented negative lenses L31 of the biconcave lens and the positive lens with the convex thereof facing the object side, the cemented lenses L32 of the biconvex lens with the aspherical surface at the object side and the negative lens with the concave thereof facing the object side, and the positive lens L33 with the convex thereof facing the image side. The fourth lens group G4 includes the positive lens L41 with the aspherical convex thereof facing the object side, and the cemented lenses L42 of the negative lens with the concave thereof facing the image side and the positive lens with the convex thereof facing the object side.

In the zoom lens 3 according to the third embodiment, the cemented negative lenses L31 serve as the negative sub-lens group, and the cemented lenses L32 and the positive lens L33 serve as the positive sub-lens group, the lenses being disposed in the third lens group G3.

In addition, the aperture stop S, which is fixed along the optical axis, is disposed near the object side of the third lens group G3, and the color separation prism PP, which is fixed along the optical axis, is disposed at the image side of the fourth lens group G4.

Table 9 shows specifications of Numeric Example 3 in which specific numerical values are applied to the third embodiment.

TABLE 9

| Surface Number | Curvature Radius | Surface Distance | Refractive Index | Abbe Number | |
|---|---|---|---|---|---|
| 1: | 24.3809 | 0.502 | 1.84666 | 23.8 | |
| 2: | 13.9540 | 1.532 | 1.45600 | 90.3 | |
| 3: | −214.7871 | 0.050 | | | |
| 4: | 13.1105 | 0.831 | 1.60300 | 65.5 | |
| 5: | 46.9098 | 0.050 | | | |
| 6: | 9.4060 | 0.871 | 1.49700 | 81.6 | |
| 7: | 23.8113 | (D7) | | | |
| 8: | 15.8186 | 0.176 | 1.83481 | 43.0 | |
| 9: | 1.9593 | 1.095 | | | |
| 10: | −8.0108 | 0.151 | 1.88300 | 40.8 | |
| 11: | 25.7611 | 0.050 | | | |
| 12: | 3.4385 | 0.814 | 1.80809 | 22.8 | |
| 13: | −8.9759 | 0.151 | 1.88300 | 40.8 | |
| 14: | 6.3992 | (D14) | | | |
| 15: | 0.0000 | 0.628 | | | (Aperture Stop) |
| 16: | −5.9219 | 0.151 | 1.74950 | 35.3 | |
| 17: | 4.7066 | 0.548 | 1.84666 | 23.8 | |
| 18: | −19.4034 | 0.151 | | | |

TABLE 9-continued

| Surface Number | Curvature Radius | Surface Distance | Refractive Index | Abbe Number |
|---|---|---|---|---|
| 19: | 15.6193 | 1.228 | 1.58913 | 61.3 |
| 20: | −2.1337 | 0.213 | 1.88300 | 40.8 |
| 21: | −7.7932 | 0.085 | | |
| 22: | −21.9672 | 1.221 | 1.49700 | 81.6 |
| 23: | −3.0471 | (D23) | | |
| 24: | 5.2667 | 1.253 | 1.58913 | 61.3 |
| 25: | 179.9768 | 0.126 | | |
| 26: | 5.4066 | 0.151 | 1.84666 | 23.8 |
| 27: | 3.0843 | 1.030 | 1.48749 | 70.4 |
| 28: | 12.1193 | (D28) | | |
| 29: | 0.0000 | 3.905 | 1.51680 | 64.2 |
| 30: | 0.0000 | (Bf) | | |

In the zoom lens 3 according to the first embodiment, along with the variation in the positional state of the lenses from the wide-angle-end state to the telephoto-end state, a surface distance D7 between the first lens group G1 and the second lens group G2, a surface distance D14 between the second lens group G2 and the aperture stop S, a surface distance D23 between the third lens group G3 and the fourth lens group G4, and a surface distance D28 between the fourth lens group G4 and the color separation prism PP are varied. Now, Table 10 shows values of the surface distances in the wide-angle-end state, in the midpoint-focus state which is between the wide-angle-end state and the telephoto-end state, and in the telephoto-end state according to Numerical Example 3, together with each focal length f, F-number Fno., and angle of view 2ω.

TABLE 10

| f | 1.000~9.196~21.061 | | |
|---|---|---|---|
| FNO | 1.65~2.18~2.88 | | |
| 2ω | 60.31~7.14~2.99° | | |
| D7 | 0.188 | 7.970 | 9.308 |
| D14 | 9.932 | 2.150 | 0.812 |
| D23 | 1.779 | 0.733 | 2.054 |
| D28 | 0.535 | 1.581 | 0.260 |
| Bf | 0.583 | 0.583 | 0.583 |

In the zoom lens 3 according to the third embodiment, lens surfaces of the 19th surface and the 24th surface are aspherical. Now, Table 11 shows aspherical coefficients A, B, C, and D at 4th, 6th, 8th, and 10th orders of the above-described surfaces according to Numerical Example 3, together with each conic constant κ.

TABLE 11

| 19th Surface | κ = −0.535226 | A = −0.367375E−02 | B = −0.340086E−03 |
| | | C = 0.100074E−04 | D = −0.234761E−04 |
| 24th Surface | κ = −0.317306 | A = −0.539214E−03 | B = −0.300931E−04 |
| | | C = 0.532791E−05 | D = 0.118175E−06 |

Table 12 shows values corresponding to the conditional expressions according to Numerical Example 3.

TABLE 12 f3n = −16.607
f1 = 13.591
f2 = −2.163
(1) Da/TL = 0.453
(2) |f3n|/fw = 16.607

Figure 11:
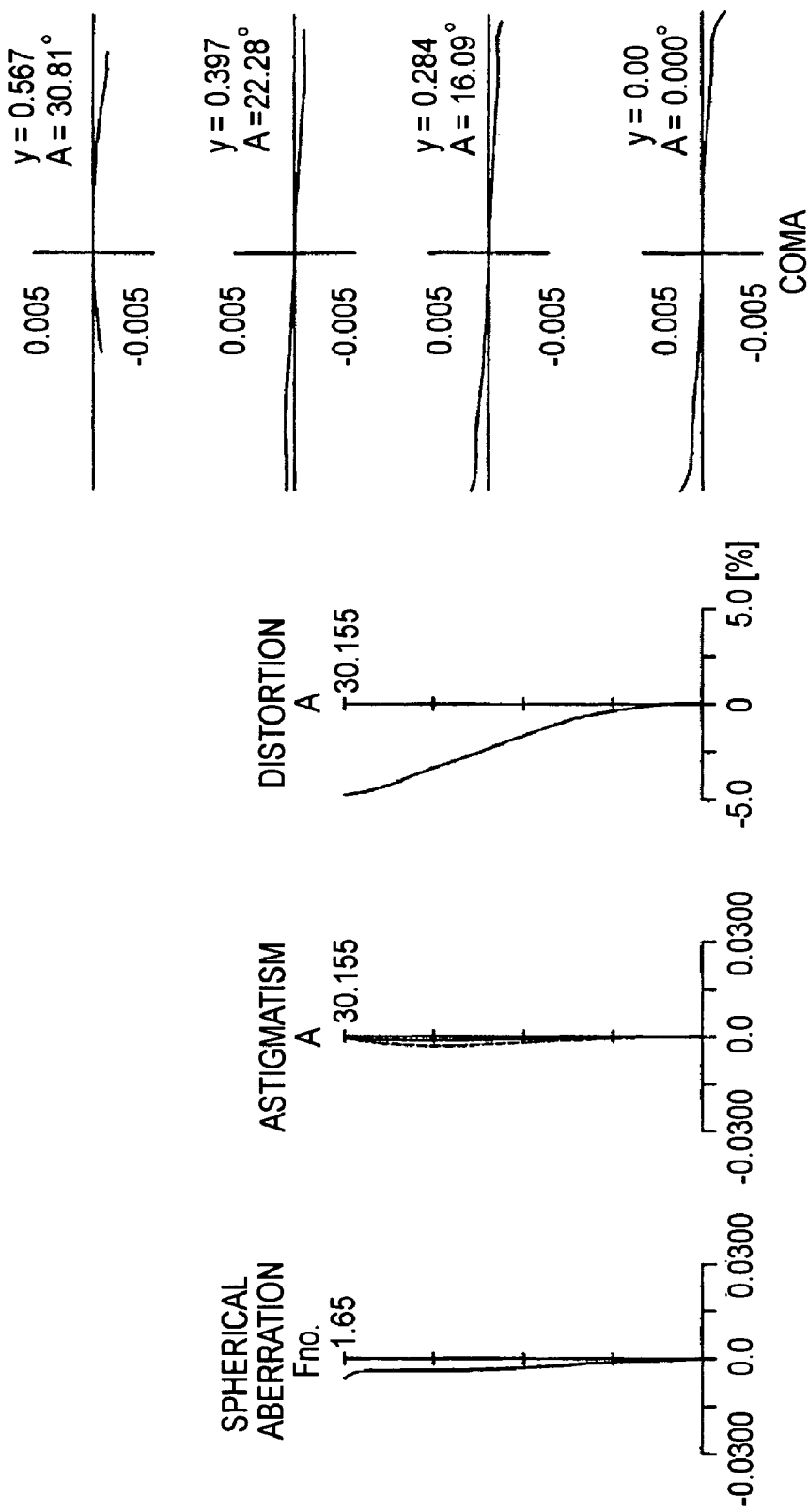
FIGS. 11, 12 and 13 are aberration diagrams of Numerical Example 3 in which specific numerical values are applied to the zoom lens according to the third embodiment of the present invention, FIG. 11 showing the spherical aberration, astigmatism, distortion, and coma in the wide-angle-end state.
Figure 12:
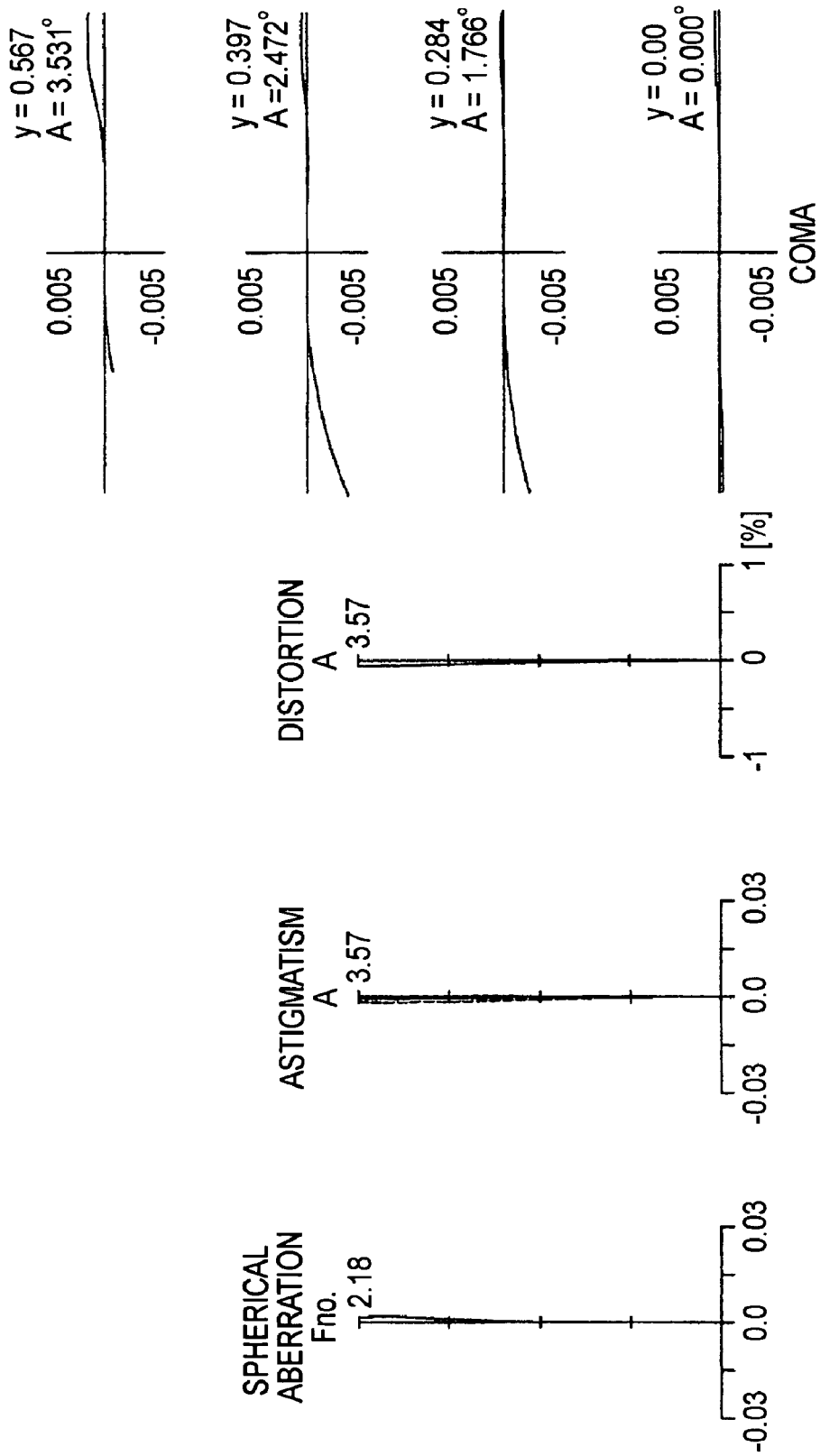
Figure 13:
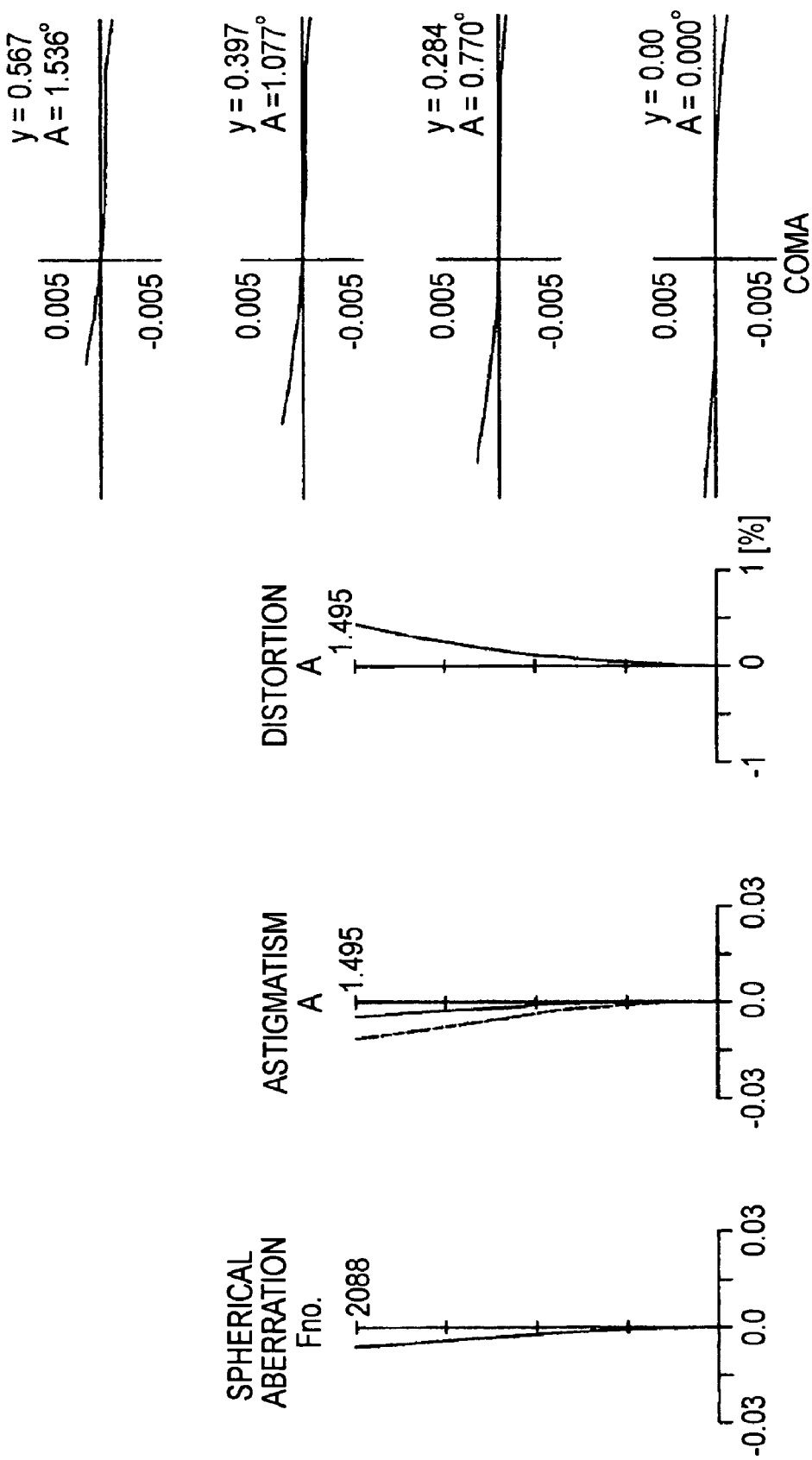

TABLE 12-continued (3) $f1/(fw \cdot ft)^{1/2} = 2.961$
(4) $|f2|/(fw \cdot ft)^{1/2} = 0.471$ FIGS. 11 to 13 are aberration diagrams while an object at infinity is in focus according to Numerical Example 3, in which FIG. 11 shows an aberration diagram in the wide-angle-end state (f=1.000), FIG. 12 shows an aberration diagram in the midpoint-focus state (f=9.196), and FIG. 13 shows an aberration diagram in the telephoto-end state (f=21.061).

In each of the aberration diagrams of FIGS. 11 to 13, a solid line in a spherical aberration diagram shows the spherical aberration; and a solid line in an astigmatism diagram shows the sagittal image plane and a broken line shows the meridional image plane. In coma diagrams, each A shows an angle of view and y shows an image height.

Figure 14:
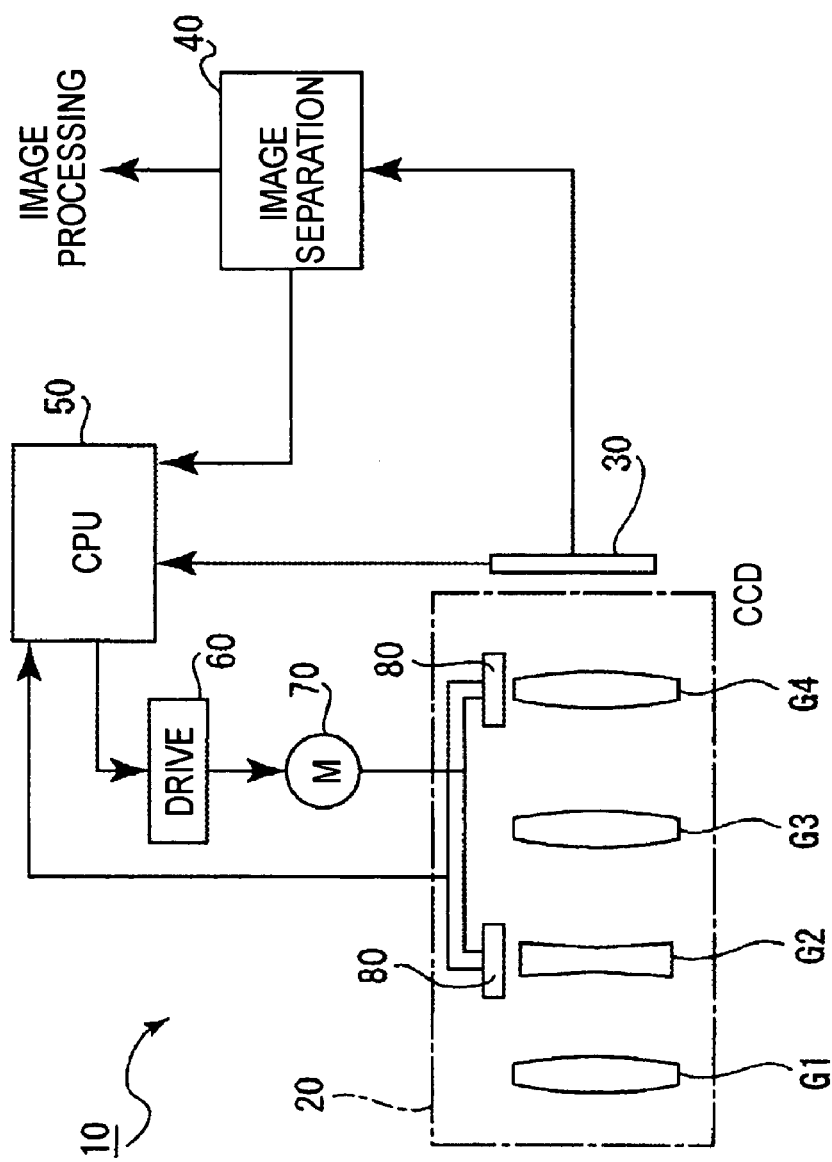
FIG. 14 is a block diagram showing an embodiment of an imaging apparatus according to the present invention.

As shown in Table 12 and the aberration diagrams, it is obvious that Numerical Example 3 satisfies the conditional expressions (1) to (4), the aberrations are reliably corrected, and excellent focusing performance is provided. FIG. 14 shows an embodiment of an imaging apparatus according to the present invention.

An imaging apparatus 10 includes a zoom lens 20, and an imager 30 for converting an optical image formed by using the zoom lens 20 into electric signals. For example, the imager 30 may employ a photoelectric converter such as a CCD (Charge Coupled Device) or CMOS (Complementary Metal-Oxide Semiconductor). The zoom lens 20 may be the one according to the present invention. FIG. 14 shows that each lens group in the zoom lens according to the first embodiment shown in FIG. 2 is illustrated as a single lens for simplification. It should be noted that the zoom lens 20 may not be the one according to the first embodiment, and may be the one according to the second or third embodiment, or may be one having a configuration not based on the embodiments described in this specification.

The electric signals formed by the imager 30 are a separated into signals for focus controlling and signals for imaging by an image separation circuit 40, so that the signals for focus controlling are sent to a control circuit 50, and the signals for imaging are sent to an image processing circuit. The signals sent to the image processing circuit are processed to be a form appropriate for the subsequent processing, and are used for various processing, for instance, to be displayed on a display unit, recorded on a recording medium, or transferred by a communication unit.

For instance, operation signals sent from the outside, due to an operation with a zoom button or the like, are input to the control circuit 50, so that the control circuit 50 exercises various processing in accordance with the operation signals. For instance, when a zooming command is input by the zoom button, a driver 70 is operated via a drive circuit 60 and the lens groups are moved to predetermined positions so as to provide a desirable focus length based on the command. Then position information of the lens groups obtained by sensors 80 is input to the control circuit 50, and is used when command signals are output to the drive circuit 60. In addition, the control circuit 50 checks a focus state based on the signals sent from the image separation circuit 40, and controls the focus state to be optimum.

The imaging apparatus 10 may employ various forms of specific products. For example, the imaging apparatus 10 may be a camera part of a digital I/O apparatus, such as a digital still camera, digital video camera, mobile phone with a camera embedded, PDA (Personal Digital Assistant) with a camera embedded.

Note that the specific shapes and numerical values shown in the embodiments and numerical examples are merely an example of implementation of the present invention, and the technical scope of the present invention should not be limited by the embodiments and numerical examples.

INDUSTRIAL APPLICABILITY

The present invention provides the zoom lens that is appropriate for 3CCD imaging system, and achieves reduction in size of the lens system while providing the high variable magnification ratio. The zoom lens is applicable to a digital video camera or digital still camera.

The invention claimed is:

1. A zoom lens, comprising:
four lens groups including a first lens group having a positive refractive power, a second lens group having a negative refractive power, a third lens group having a positive refractive power, and a fourth lens group having a positive refractive power, sequentially arranged from an object side, wherein when a positional state of lenses is varied from a wide-angle-end state to a telephoto-end state, the second lens group is moved to an image side, the fourth lens group is moved for compensating a variation in a position of an image plane caused by the movement of the second lens group, and the first lens group and the third lens group are fixed along the optical axis; and
an aperture stop disposed at the object side of the third lens group,
wherein the third lens group includes a negative sub-lens group having a negative refractive power, and a positive sub-lens group disposed at the image side of the negative sub-lens group with an airspace interposed therebetween, the positive sub-lens group having a positive refractive power, and
wherein the first lens group includes four lenses including cemented lenses of a negative lens and a positive lens, a positive lens, and a positive lens, sequentially arranged from the object side, and
the following conditional expression (1) is satisfied:

$$0.4 < Da/TL < 0.5 \tag{1}$$

where Da is a distance between the aperture stop and the image plane, and TL is an overall optical length comprising the distance between a lens surface closest to the object side and the position of the image plane, along the optical axis.

2. A zoom lens, comprising:
four lens groups including a first lens group having a positive refractive power, a second lens group having a negative refractive power, a third lens group having a positive refractive power, and a fourth lens group having a positive refractive power, sequentially arranged from an object side, wherein when a positional state of lenses is varied from a wide-angle-end state to a telephoto-end state, the second lens group is moved to an image side, the fourth lens group is moved for compensating a variation in a position of an image plane caused by the movement of the second lens group, and the first lens group and the third lens group are fixed along the optical axis; and
an aperture stop disposed at the object side of the third lens group,
wherein the third lens group includes a negative sub-lens group having a negative refractive power, and a positive sub-lens group disposed at the image side of the negative sub-lens group with an airspace interposed therebetween, the positive sub-lens group having a positive refractive power, and
the following conditional expression (1) is satisfied:

$$0.4 < Da/TL < 0.5 \tag{1}$$

where Da is a distance between the aperture stop and the image plane, and TL is an overall optical length comprising the distance between a lens surface closest to the object side and the position of the image plane, along the optical axis, and
wherein the following conditional expression (2) is satisfied:

$$13 < |f3n|/fw < 18 \tag{2}$$

where f3n is a focal length of the negative sub-lens group disposed in the third lens group, and fw is a focal length of the whole lens system in the wide-angle-end state.

3. The zoom lens according to claim 1, wherein the following conditional expression (2) is satisfied:

$$13 < |f3n|/fw < 18 \tag{2}$$

where f3n is a focal length of the negative sub-lens group disposed in the third lens group, and fw is a focal length of the whole lens system in the wide-angle-end state.

4. The zoom lens according to claim 1 or 2, wherein the following conditional expression (3) is satisfied:

$$2.5 < f1/(fw \cdot ft)^{1/2} < 3.5 \tag{3}$$

where f1 is a focal length of the first lens group, and ft is a focal length of the whole lens system in the telescope end state.

5. The zoom lens according to claim 1 or 2, wherein the second lens group includes four lenses including a meniscus negative lens with a concave thereof facing the image side, a negative lens, a positive lens, and a negative lens, sequentially arranged from the object side.

6. The zoom lens according to claim 5, wherein the following conditional expression (4) is satisfied:

$$0.42 < |f2|/(fw \cdot ft)^{1/2} < 0.5 \tag{4}$$

where f2 is a focal length of the second lens group.

7. The zoom lens according to claim 1 or 2, wherein the fourth lens group includes three lenses including a positive lens, a negative lens, and a positive lens, sequentially arranged from the object side.

8. An imaging apparatus, comprising:
a zoom lens; and
an imager which converts an optical image formed by using the zoom lens into electric signals,
wherein the zoom lens includes:
four lens groups including a first lens group having a positive refractive power, a second lens group having a negative refractive power, a third lens group having a positive refractive power, and a fourth lens group having a positive refractive power, sequentially arranged from an object side, wherein when a positional state of lenses is varied from a wide-angle-end state to a telephoto-end state, the second lens group is moved to an image side, the fourth lens group is moved for compensating a variation in a position of an image plane caused by the movement of the second lens group, and the first lens group and the third lens group are fixed along the optical axis; and an aperture stop disposed at the object side of the third lens group, wherein the third lens group includes a negative sub-lens group having a negative refractive power, and a positive sub-lens group disposed at the image side of the negative sub-lens group with an airspace interposed therebetween, the positive sub-lens group having a positive refractive power, and wherein the first lens group includes four lenses including cemented lenses of a negative lens and a positive lens, a positive lens, and a positive lens, sequentially arranged from the object side, and the following conditional expression (1) is satisfied:

$$0.4 < Da/TL < 0.5 \qquad (1)$$

where Da is a distance between the aperture stop and the image plane, and TL is an overall optical length comprising the distance between a lens surface closest to the object side and the position of the image plane, along the optical axis.

9. An imaging apparatus, comprising:

a zoom lens; and an imager which converts an optical image formed by using the zoom lens into electric signals, wherein the zoom lens includes:

four lens groups including a first lens group having a positive refractive power, a second lens group having a negative refractive power, a third lens group having a positive refractive power, and a fourth lens group having a positive refractive power, sequentially arranged from an object side, wherein when a positional state of lenses is varied from a wide-angle-end state to a telephoto-end state, the second lens group is moved to an image side, the fourth lens group is moved for compensating a variation in a position of an image plane caused by the movement of the second lens group, and the first lens group and the third lens group are fixed along the optical axis; and an aperture stop disposed at the object side of the third lens group, wherein the third lens group includes a negative sub-lens group having a negative refractive power, and a positive sub-lens group disposed at the image side of the negative sub-lens group with an airspace interposed therebetween, the positive sub-lens group having a positive refractive power, and the following conditional expression (F) is satisfied:

$$0.4 < Da/TL < 0.5 \qquad (1)$$

where Da is a distance between the aperture stop and the image plane, and TL is an overall optical length comprising the distance between a lens surface closest to the object side and the position of the image plane, along the optical axis, and wherein the following conditional expression (2) is satisfied:

$$13 < |f3n|/fw < 18 \qquad (2)$$

where f3n is a focal length of the negative sub-lens group disposed in the third lens group, and fw is a focal length of the whole lens system in the wide-angle-end state.

10. The imaging apparatus according to claim 8, wherein the following conditional expression (2) is satisfied:

$$13 < |f3n|/fw < 18 \qquad (2)$$

where f3n is a focal length of the negative sub-lens group disposed in the third lens group, and fw is a focal length of the whole lens system in the wide-angle-end state.

11. The imaging apparatus according to claim 8 or 9, wherein the following conditional expression (3) is satisfied:

$$2.5 < f1/(fw \cdot ft)^{1/2} < 3.5 \qquad (3)$$

where f1 is a focal length of the first lens group, and ft is a focal length of the whole lens system in the telescope end state.

12. The imaging apparatus according to claim 8 or 9, wherein the second lens group includes four lenses including a meniscus negative lens with a concave thereof facing the image side, a negative lens, a positive lens, and a negative lens, sequentially arranged from the object side.

13. The imaging apparatus according to claim 12, wherein the following conditional expression (4) is satisfied:

$$0.42 < |f2|/(fw \cdot ft)^{1/2} < 0.5 \qquad (4)$$

where f2 is a focal length of the second lens group.

14. The imaging apparatus according to claim 8 or 9, wherein the fourth lens group includes three lenses including a positive lens, a negative lens, and a positive lens, sequentially arranged from the object side.

* * * * *